(12) United States Patent
Murata et al.

(10) Patent No.: US 6,826,274 B1
(45) Date of Patent: Nov. 30, 2004

(54) EXCHANGE CONTROL METHOD

(75) Inventors: Satoshi Murata, Kawasaki (JP); Yuichi Sugimura, Kawasaki (JP); Mamoru Higuchi, Kawasaki (JP); Keigoro Yokota, Kawasaki (JP); Tatsuo Sunouchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/510,076

(22) Filed: Feb. 22, 2000

(30) Foreign Application Priority Data

Mar. 12, 1999 (JP) ............................................ 11-066205

(51) Int. Cl.[7] .............................. H04M 3/00; H04M 7/00
(52) U.S. Cl. .................. 379/221.04; 379/230; 379/269; 379/279; 379/333
(58) Field of Search ....................... 379/221.03, 221.04, 379/230, 231, 234, 268, 269, 279, 333, 334, 335, 336, 337

(56) References Cited

U.S. PATENT DOCUMENTS

| | | | | |
|---|---|---|---|---|
| 4,943,999 A | * | 7/1990 | Ardon .................... | 379/221.01 |
| 5,255,315 A | * | 10/1993 | Bushnell ...................... | 379/230 |
| 5,465,294 A | * | 11/1995 | Chapman et al. ...... | 379/221.04 |
| 5,574,783 A | * | 11/1996 | Dunn ......................... | 379/230 |

FOREIGN PATENT DOCUMENTS

| | | |
|---|---|---|
| JP | 51-82504 | 7/1976 |
| JP | 54-121008 | 9/1979 |
| JP | 54-129911 | 10/1979 |

(List continued on next page.)

Primary Examiner—Harry S. Hong
(74) Attorney, Agent, or Firm—Katten Muchin Zavis Rosenman

(57) ABSTRACT

The present invention concerns an exchange control method, wherein an old host exchange accommodating a remote switch unit or subscribers is adapted to be accommodated in a new host exchange, and its object is to allow call processing control to be performed by the new host exchange while making effective use of the resources of the old host exchange including the remote switch unit. The new host exchange and the old host exchange are connected in an interoffice configuration by a signaling link, and each exchange includes an emulation processor; the old host exchange and the new host exchange perform message editing and exchange between the respective emulation processors, and exchange control is performed in such a manner that when there occurs data or a request for basic control that is normally processed at the old host exchange, the data or request is transferred to the new host exchange, and the new host exchange processes the data or request and sends a notification to the old host exchange.

7 Claims, 31 Drawing Sheets

FOREIGN PATENT DOCUMENTS

| | | |
|---|---|---|
| JP | 55-118259 | 9/1980 |
| JP | 55-118260 | 9/1980 |
| JP | 56-80990 | 7/1981 |
| JP | 57-39643 | 3/1982 |
| JP | 59-112754 | 6/1984 |
| JP | 59-174061 | 10/1984 |
| JP | 60-51345 | 3/1985 |
| JP | 60-191543 | 9/1985 |
| JP | 61-25355 | 2/1986 |
| JP | 61-25398 | 2/1986 |
| JP | 61-212943 | 9/1986 |
| JP | 61-224697 | 10/1986 |
| JP | 62-59442 | 3/1987 |
| JP | 63-294157 | 11/1988 |
| JP | 2-30265 | 1/1990 |
| JP | 2-95072 | 4/1990 |
| JP | 3-135153 | 6/1991 |
| JP | 4-82334 | 3/1992 |
| JP | 5-22768 | 1/1993 |
| JP | 5-244659 | 9/1993 |
| JP | 5-308677 | 11/1993 |
| JP | 5-327749 | 12/1993 |
| JP | 5-336232 | 12/1993 |
| JP | 6-61927 | 3/1994 |
| JP | 6-85839 | 3/1994 |
| JP | 6-133032 | 5/1994 |
| JP | 7-30659 | 1/1995 |
| JP | 7-193856 | 7/1995 |
| JP | 7-250380 | 9/1995 |
| JP | 8-51657 | 2/1996 |
| JP | 8-79241 | 3/1996 |
| JP | 8-88878 | 4/1996 |
| JP | 8-154268 | 6/1996 |
| JP | 8-280060 | 10/1996 |
| JP | 8-293924 | 11/1996 |
| JP | 8-331262 | 12/1996 |
| JP | 8-340583 | 12/1996 |
| JP | 9-23269 | 6/1997 |
| JP | 9-247268 | 9/1997 |
| JP | 10-79968 | 3/1998 |
| JP | 10-108227 | 4/1998 |
| JP | 10-136085 | 5/1998 |

* cited by examiner

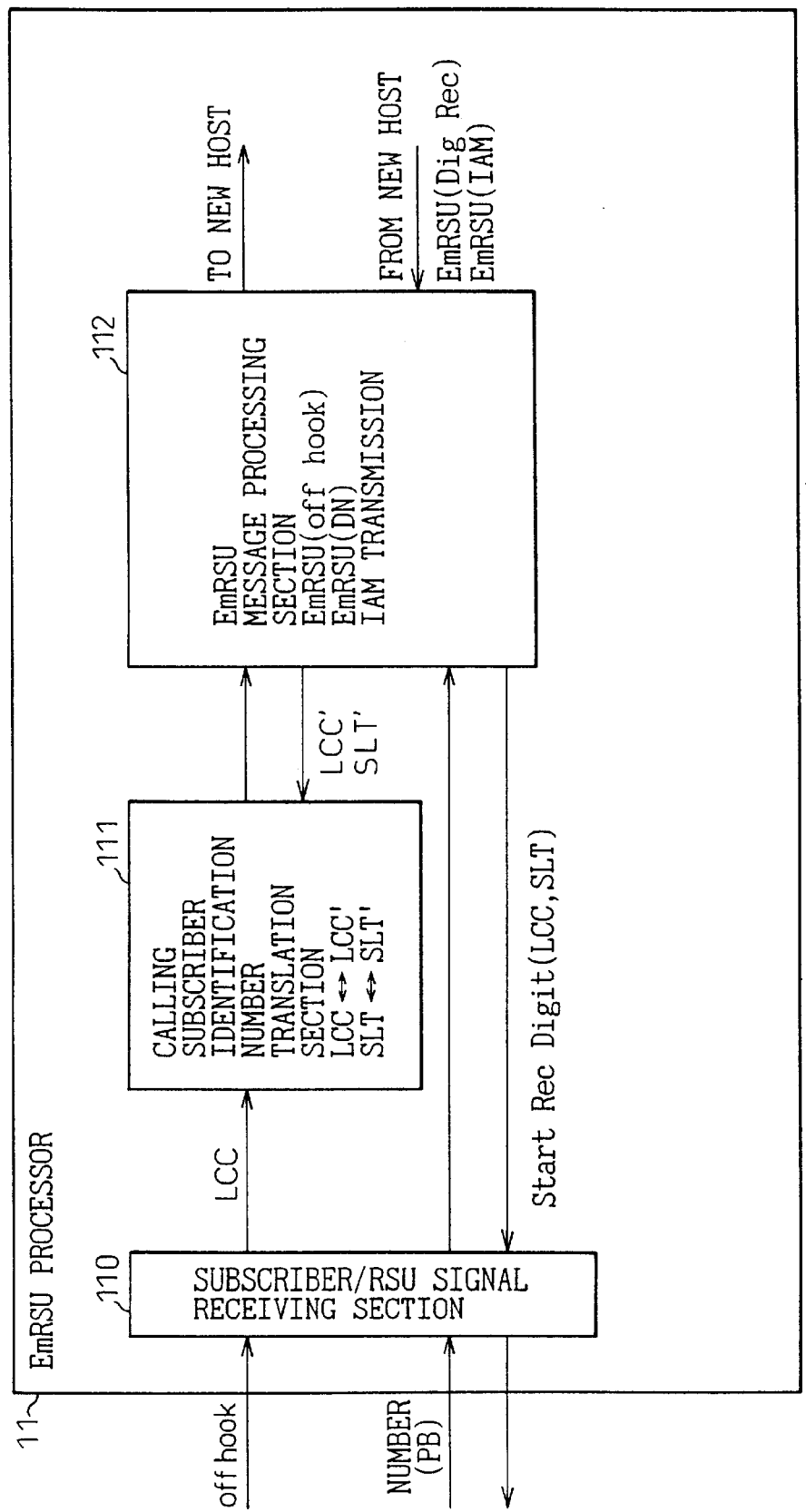

EmRSU MESSAGE Header: CALL IDENTIFICATION NUMBER
Message Type: MESSAGE TYPE(off hook SIGNAL)
TEI(LCC): CALLING SUBSCRIBER IDENTIFIER EmRSU MESSAGE Header: CALL IDENTIFICATION NUMBER
Message Type: MESSAGE TYPE(DESTINATION NUMBER SIGNAL)
DN: DESTINATION SUBSCRIBER IDENTIFIER

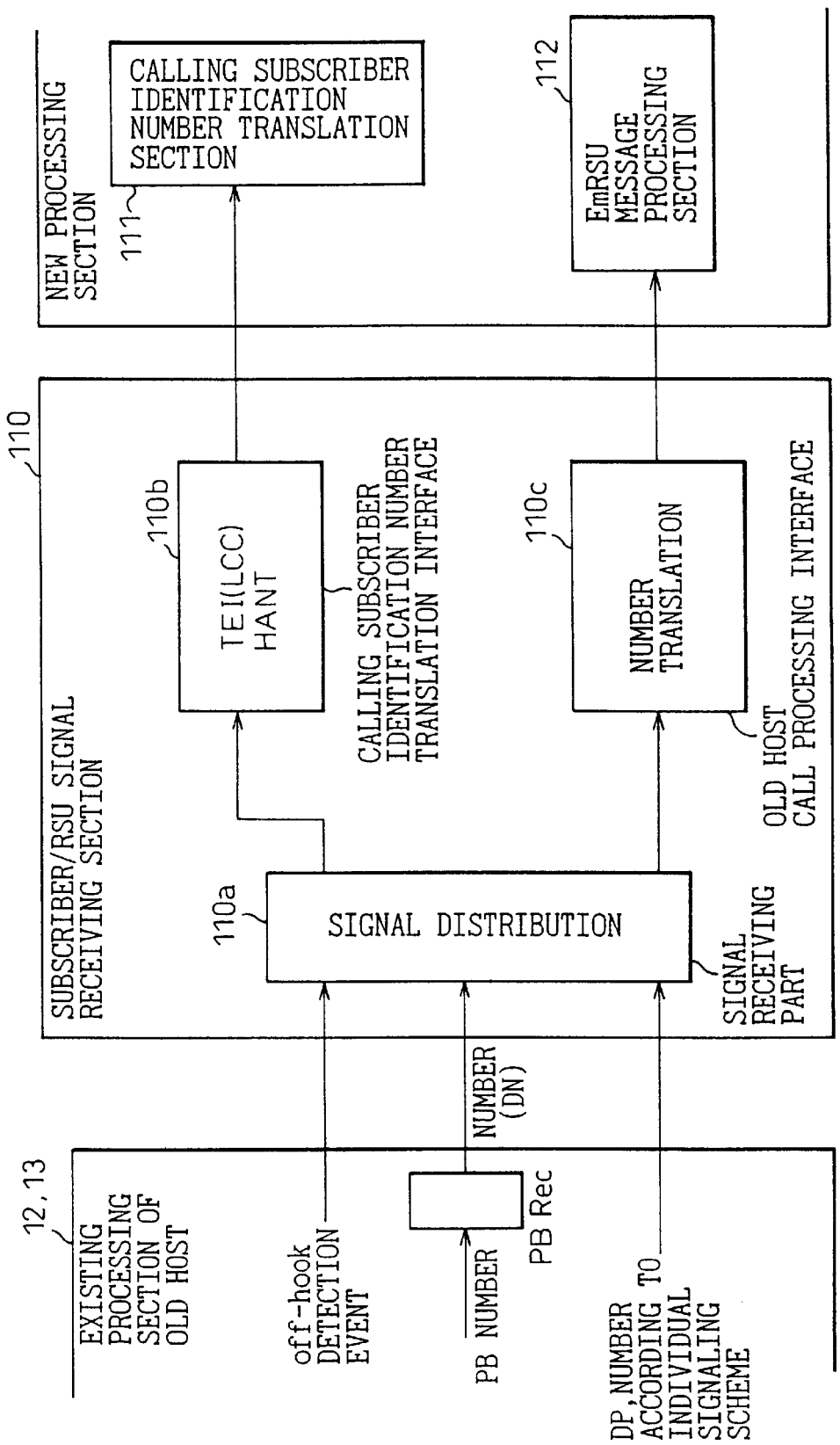

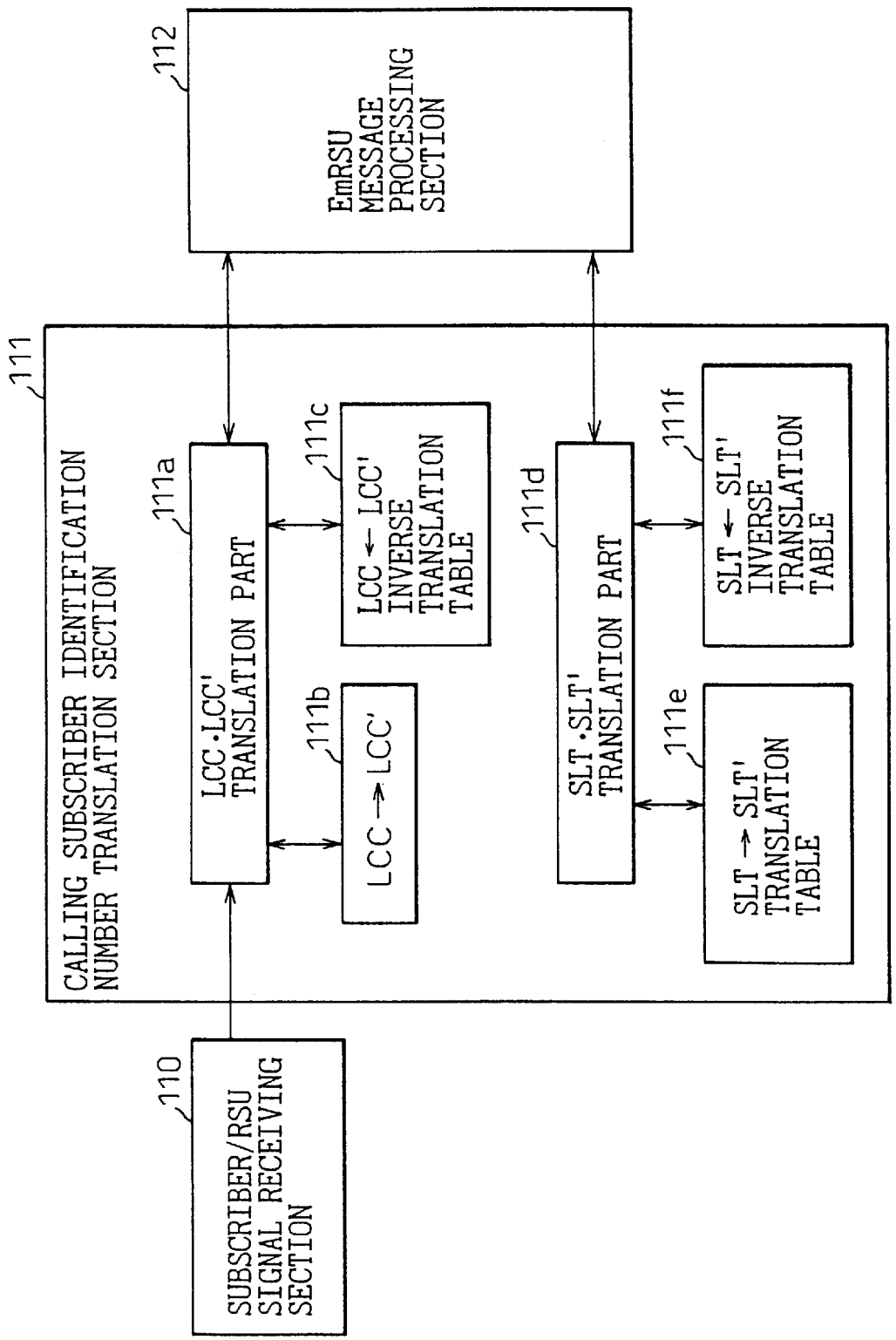

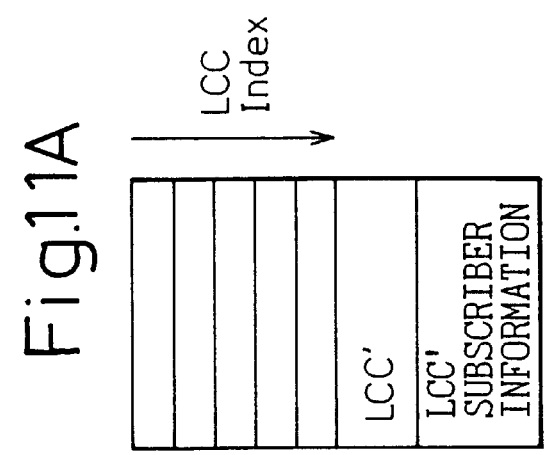
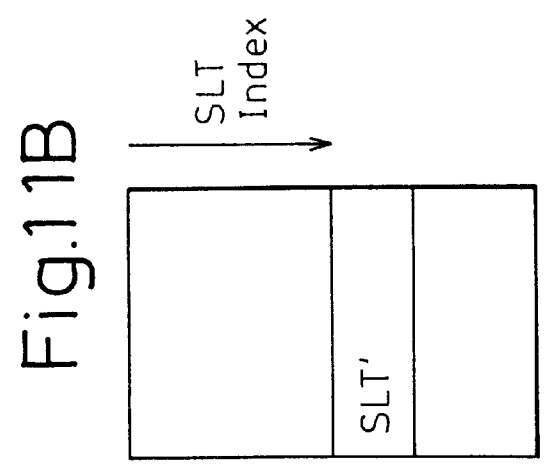
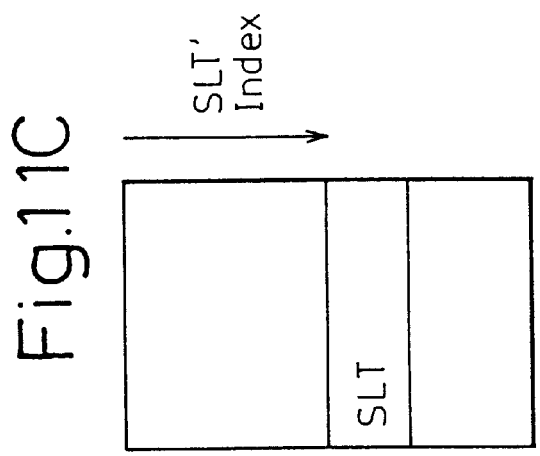

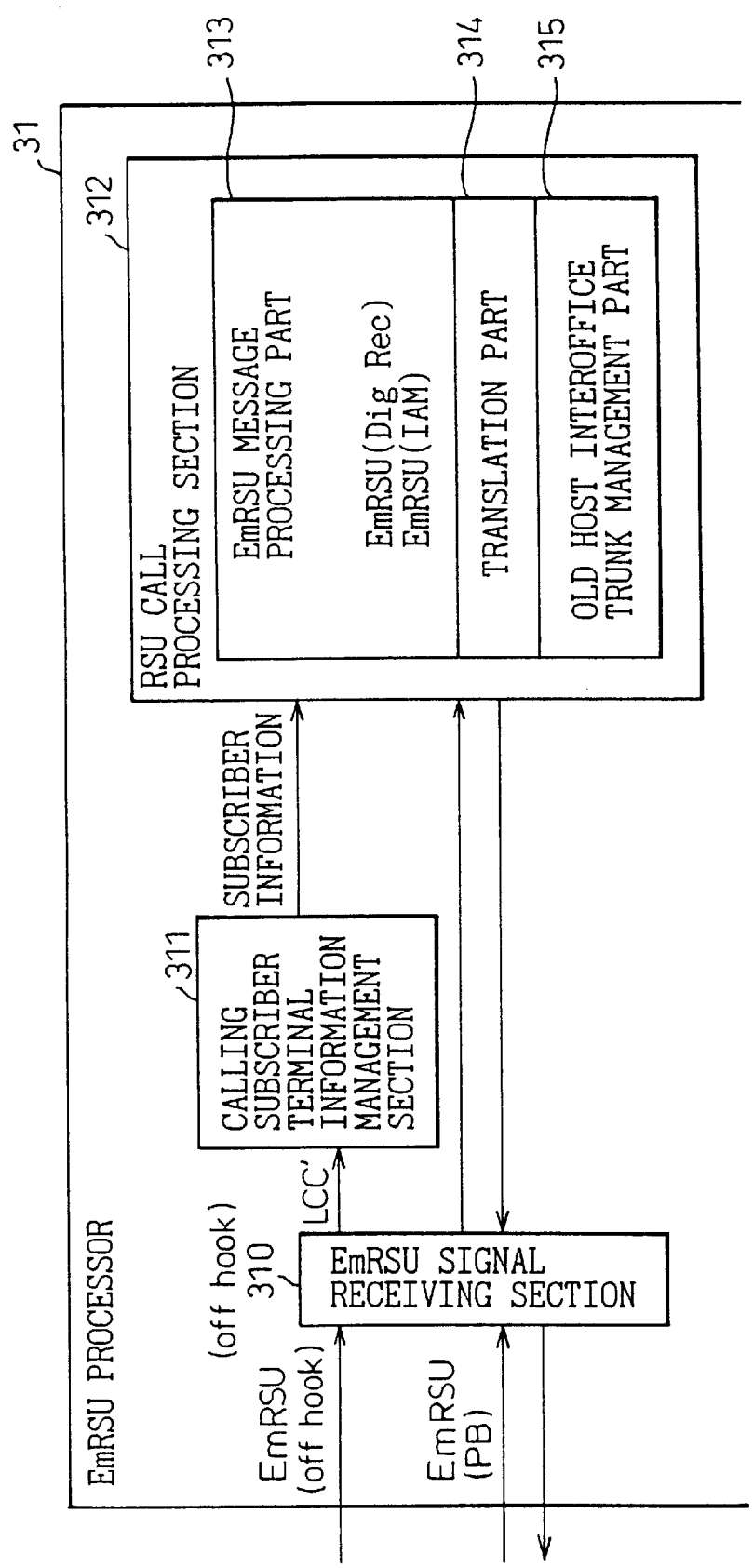

EmRSU MESSAGE Header: CALL IDENTIFICATION NUMBER
Message Type: MESSAGE TYPE(Digit Receive SIGNAL)

EmRSU MESSAGE Header: CALL IDENTIFICATION NUMBER
Message Type: MESSAGE TYPE(IAM SIGNAL)
IAM: IAM MESSAGE

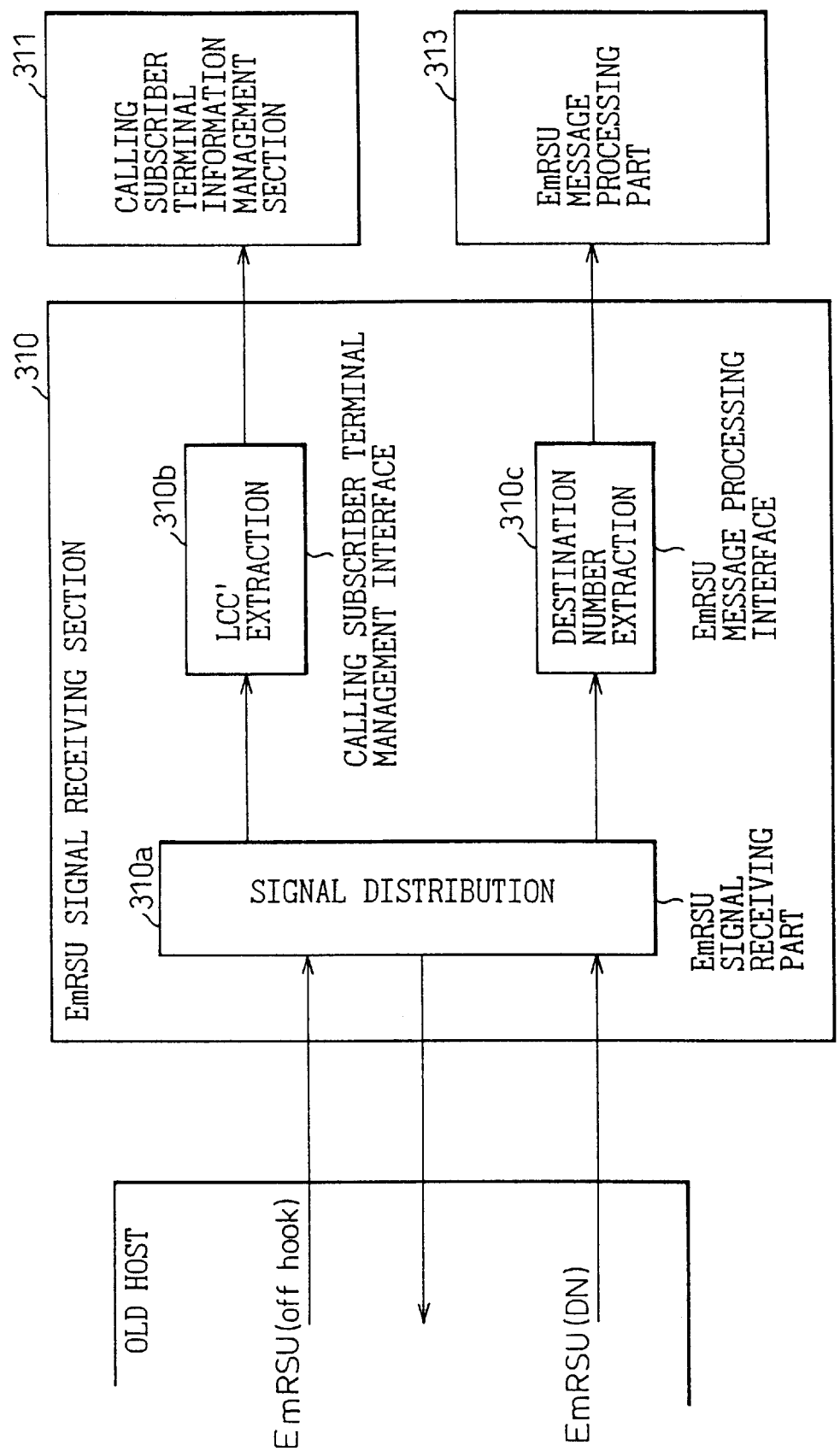

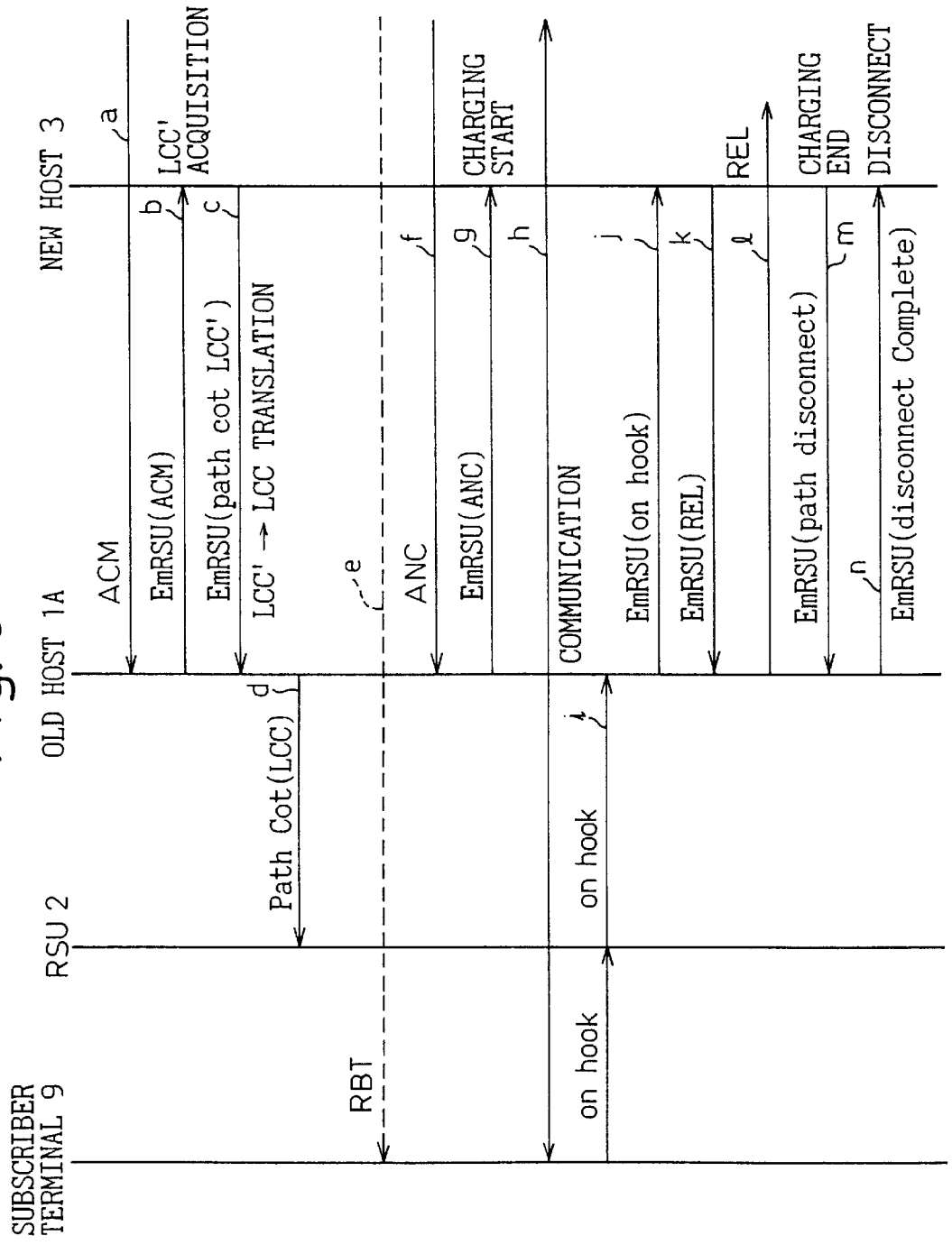

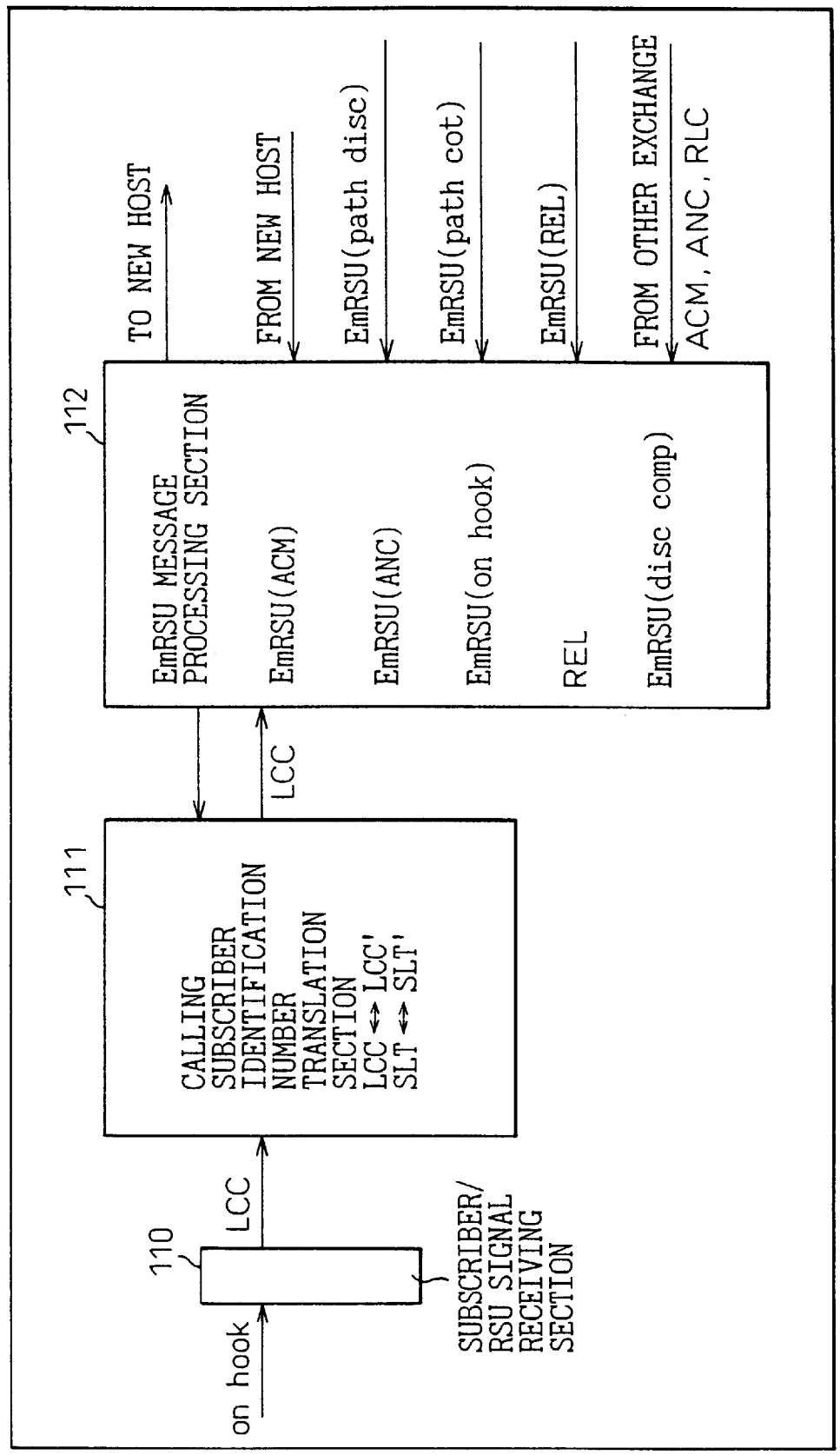

Fig.21A

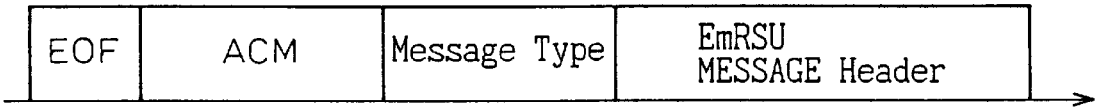

EmRSU MESSAGE Header: CALL IDENTIFICATION NUMBER
Message Type: MESSAGE TYPE(ACM SIGNAL)
ACM: ACM MESSAGE

Fig.21B

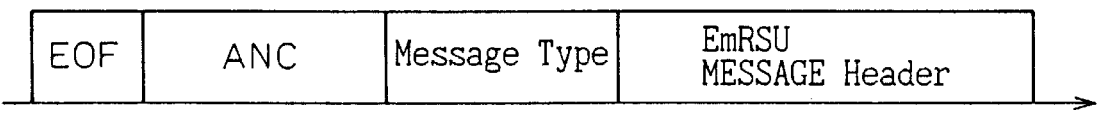

EmRSU MESSAGE Header: CALL IDENTIFICATION NUMBER
Message Type: MESSAGE TYPE(ANC SIGNAL)
ANC: ANC MESSAGE

Fig.21C

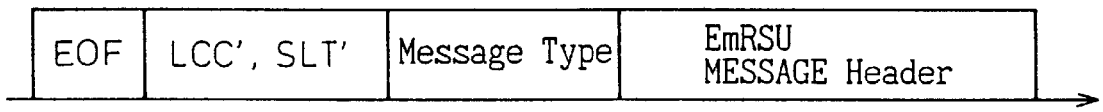

EmRSU MESSAGE Header: CALL IDENTIFICATION NUMBER
Message Type: MESSAGE TYPE(on hook SIGNAL)

Fig.21D

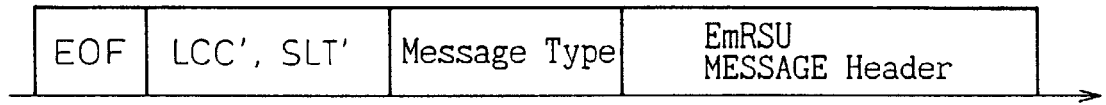

EmRSU MESSAGE Header: CALL IDENTIFICATION NUMBER
Message Type: MESSAGE TYPE(disc comp SIGNAL)

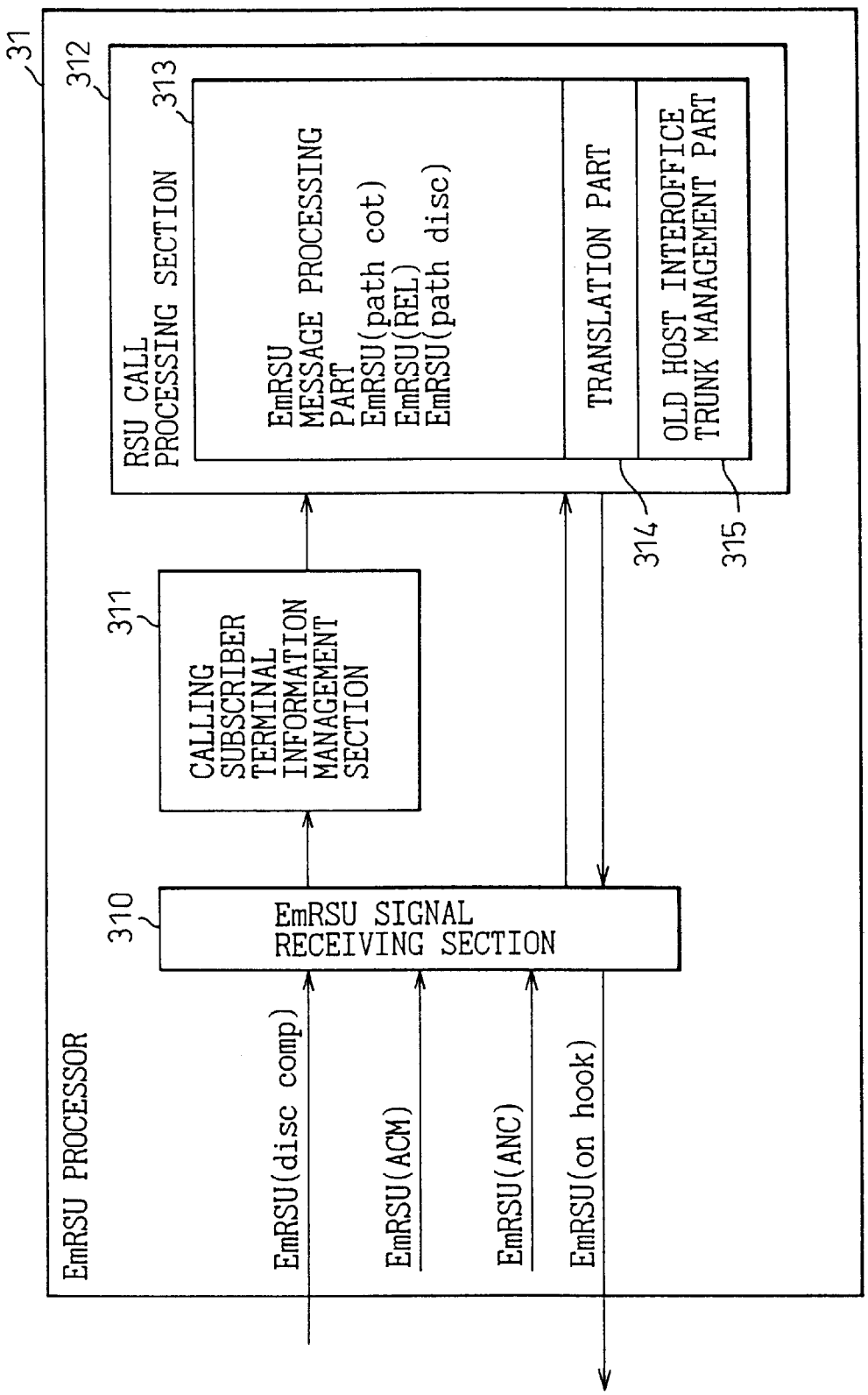

Fig.23A

| EOF | LCC', SLT' | Message Type | EmRSU MESSAGE Header |
|---|---|---|---|

EmRSU MESSAGE Header: CALL IDENTIFICATION NUMBER
Message Type: MESSAGE TYPE(path cot SIGNAL)

Fig.23B

| EOF | REL | Message Type | EmRSU MESSAGE Header |
|---|---|---|---|

EmRSU MESSAGE Header: CALL IDENTIFICATION NUMBER
Message Type: MESSAGE TYPE(REL SIGNAL)
REL: Release MESSAGE

Fig.23C

| EOF | LCC', SLT' | Message Type | EmRSU MESSAGE Header |
|---|---|---|---|

EmRSU MESSAGE Header: CALL IDENTIFICATION NUMBER
Message Type: MESSAGE TYPE(path disc SIGNAL)

Fig.25
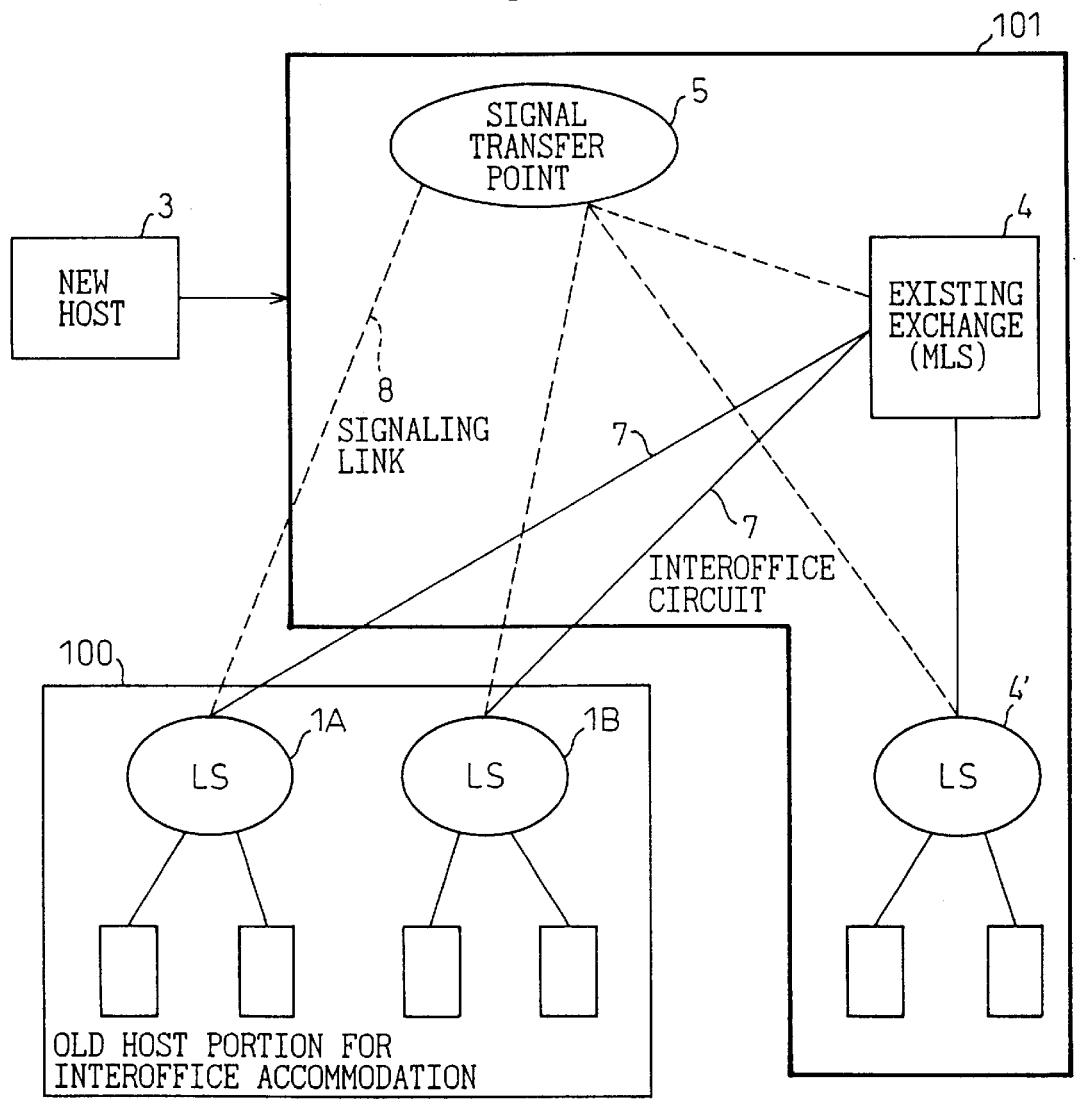
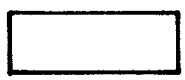 LS/MLS WHERE CHANGED NUMBERS OF SUBSCRIBERS OF OLD HOST FOR INTEROFFICE ACCOMMODATION AND OPERATION DATA TO EFFECT ACCOMMODATION IN NEW HOST ARE ADDED
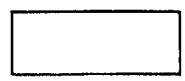 LSs WHERE SUBSCRIBER DATA ARE ADDED FOR ACCOMMODATION IN NEW HOST

EXCHANGE CONTROL METHOD

BACKGROUND OF THE INVENTION

1. Field of the Invention

The present invention relates to an exchange control method for providing to subscribers new services that cannot be provided by a host exchange accommodating a remote switch unit (RSU) or by an outdated host exchange or an existing exchange accommodating general subscribers.

With advances in electronic exchange technology, the capacity of switching exchanges has been increasing. With this trend, the capacity of remote switch units (RSUs), installed in locations distant from their hosts, has also been increasing, and the larger the capacity, the greater the influence when subscribers accommodated in an RSU become unable to connect to subscribers outside the local exchange because of a failure, etc. of the host exchange to which the RSU is attached. There is thus a need to enable connections to be made to subscribers outside the local exchange even when the link to the host exchange is disconnected. Furthermore, when the host exchange has become outdated, it would be costly if all facilities were to be replaced with new exchange facilities that could provide exchange services including new services, and new solutions are thus needed to address such situations.

2. Description of the Related Art

FIG. 1 shows the system configuration of an exchange network; in the figure, RSU designates a remote switch unit which accommodates telephone terminals of a limited number of subscribers (for example, 1000 to 2000 subscribers). The remote switch unit (hereinafter called the RSU) is attached to a host exchange A (designated as HOST-A) via an intraoffice link. The host exchange A also accommodates subscriber lines of telephone terminals under its direct control. The host exchange A is connected to another host exchange B by an interoffice link (which includes signaling links and interoffice lines), and the host exchange A (hereinafter called the HOST-A) and the host exchange B (hereinafter called the HOST-B) are connected to other exchanges (not shown) by interoffice links.

In this configuration, the RSU is attached to the HOST-A via an intraoffice link. The intraoffice link connects between the HOST-A and the RSU, link by link and point to point, using one signal link set and a plurality of lines. In this case, the RSU is subservient to the HOST-A, and a call request by an RSU subscriber is always delivered to the HOST-A for call processing. Accordingly, when a subscriber accommodated in some other exchange (for example, the HOST-B) wants to communicate with an RSU subscriber served by the HOST-A, the communication must always be established through the HOST-A.

FIG. 2 shows an operational sequence for processing a call initiated by an RSU subscriber according to the prior art. The operational sequence shows the control procedures that the host exchange A (designated simply as HOST in FIG. 2) performs when a call is initiated by a subscriber in the RSU shown in FIG. 1. Interoffice protocol signaling is performed using ISUP. ISUP denotes ISDN User Part, a protocol used in an ISDN network based on Common Channel Signaling System No. 7, and is used to control call setup and release and additional services in the ISDN network by interworking with the layer 3 protocol of the D channel used to transfer control signals between the user and the network.

When the RSU subscriber goes off-hook (a in FIG. 2), the off-hook condition is detected by the RSU, and an off-hook signal carrying a subscriber terminal. identifier (TEI) is sent to the HOST (b in the figure) which, using an LCC (subscriber identification number) extracted from the subscriber terminal identifier (TEI), searches a calling subscriber information table and retrieves subscriber information which is analyzed. After analyzing the information, a destination number receive signal (Start Receive Digit) carrying a subscriber line trunk number (SLT) and calling subscriber identification number (LCC) is sent to the RSU to receive a destination number (called party number) (c in the figure). A line from the HOST to the calling subscriber terminal is thus connected, and a DT (dial tone) is sent to the calling subscriber, prompting the subscriber to enter a destination number (d in the figure). When the subscriber enters a destination number in response to the dial tone (e in the figure), the destination number is sent out on the connected line and delivered to the HOST, which then performs number translation and analysis and sends an IAM (Initial Address Message: A call setup message, an ISUP signaling message, that contains the destination address, the trunk information of the originating exchange, etc.) to the destination exchange serving the called subscriber (f in the figure). In FIG. 2, since the subscriber generates the dial number using a multifrequency signal (PB signal), the signal is translated and analyzed at the HOST but, in the case of dial pulses (DP), the RSU receives the pulse signal and translates it into the number before sending it to the HOST.

FIG. 3 shows an operational sequence after the AM is sent out in FIG. 2, until the line is disconnected. When the IAM message is sent from the HOST to the destination exchange, if the call can be connected at the destination, the destination exchange seizes the trunk of the called subscriber and sends an ACM (Address Complete Message: A ISUP message that indicates the completion of address signal reception) to the HOST (g in FIG. 3), signifying that ringing (transmission of a ringing signal) has started. In response, the HOST sends a path connection complete signal (Path Connect) to the RSU (h in the figure), signifying that a connection with the destination exchange has been completed, and transmits a ring back tone (RBT), sent from the destination exchange, to the calling subscriber (i in the figure). When the called subscriber goes off-hook, an ANC (Answer Charge) message signifying the start of call charging is delivered to the HOST (j in the figure), upon which the call charging is started at the originating HOST and the communication is thus started (k in the figure). Thereafter, when the communication ends and an on-hook signal from the subscriber is delivered to the HOST (1 in the figure), the HOST sends a REL (Release) message signifying the call release to the destination exchange (m in the figure), and releases the path to end the call charging. After that, when an RLC (Release Complete) message signifying the completion of the call release is received from the destination exchange (n in the figure), all resources are released.

Since RSU subscribers are controlled by the HOST exchange, as described above, if the intraoffice link in FIG. 2 connecting between the HOST-A and the RSU is severed for any reason (including the occurrence of a failure in the HOST-A), the RSU subscribers cannot communicate with the HOST-A, not to mention the subscribers beyond the HOST-A. In this case, however, intra-RSU communications can be made possible by designing a stand-alone capability into the RSU.

Such a link by link configuration can be tolerated for applications, such as RSUs serving a small number of subscribers, because the influence is limited, but when the number of subscribers to be served becomes large, communications via the host exchange cannot be provided by the stand-alone capability.

On the other hand, when a host exchange accommodating a large number of subscribers becomes outdated, or when it is desired to provide to subscribers new services that the existing exchange cannot provide, the situation could be addressed by accommodating all the existing subscribers in a newly installed exchange, but since hardware such as subscriber circuits, etc. in the existing exchange must be replaced with new hardware, this would require an enormous investment.

As described above, if new services are to be realized in an outdated host exchange accommodating a large number of subscribers, including intraoffice links to remote switch units (RSUs), large-scale hardware and software for realizing the new services have to be newly provided, and the costs involved are enormous.

Also, discarding the hardware of the outdated host exchange poses a problem in that resources are wasted.

SUMMARY OF THE INVENTION

It is an object of the present invention to provide an exchange control method that allows call processing control to be performed by a new host exchange, while making effective use of the resources of the old exchange including the remote switch unit.

According to the present invention:

(1) An old host exchange accommodating a remote switch unit or subscribers is adapted to be accommodated as a remote switch unit in a new host exchange, the new host exchange and the old host exchange are connected in an interoffice configuration by a signaling link, each of the exchanges being provided with an emulation processor, and the old host exchange and the new host exchange perform message editing and exchange between the respective emulation processors, and exchange control is performed in such a manner that when there occurs data or a request for basic control that is normally processed at the old host exchange, the data or request is transferred to the new host exchange, and the new host exchange processes the data or request and sends a notification to the old host exchange.

(2) In the configuration (1), the emulation processor in the old host exchange is provided with a table for translating subscriber identification information and subscriber line trunk information of the accommodated subscribers to and from subscriber identification information and subscriber line trunk information used to manage each of the subscribers at the new host exchange, and the new host exchange manages each of the subscribers by using a number translated for the new host exchange from the subscriber information held in the old host exchange.

(3) In the configuration (1), the emulation processor in the old host exchange includes a signal receiving section for receiving signals from the accommodated subscribers or from subscribers accommodated in the remote switch unit attached to the old host exchange, a calling subscriber identification number translation section having a table for translating calling subscriber information between the old host exchange and the new host exchange, and a message processing section for performing transmission and reception of unique messages to and from the new host exchange, wherein when an off-hook signal, destination number, or other information from a calling subscriber is received by the receiving section, the calling subscriber identification number translation section translates the identification number of the calling subscriber into the number managed at the new host exchange, and the message processing section, using the translated calling subscriber identification number, creates a message containing the received information and transmits the message to the new host exchange.

(4) In the configuration (3), when a message reporting called party ringing, call charging start, called party call release complete, or other status, is received from other exchange via a common channel signaling system signaling link, the emulation processor in the old host exchange creates a message containing information signifying the reported status and transmits the message to the new host exchange.

(5) In the configuration (1), the emulation processor in the new host exchange includes a signal receiving section for performing transmission and reception of emulation signals, a calling subscriber terminal information management section for managing subscriber information concerning the subscribers accommodated in the old host exchange, and an emulation call processing section for performing message processing and management of old host interoffice trunks, and when the signal receiving section receives a destination number from the old host exchange, the emulation call processing section translates the destination number to extract destination-side information, retrieves an open trunk from the managed old host interoffice trunks, edits a call setup message containing information of the retrieved trunk, and transmits the message to the old host exchange.

(6) In the configuration (5), when the call setup message is received from the new host exchange, the emulation processor in the old host exchange transmits a call setup message to other exchange via the specified trunk and, when a notification signifying that the destination is ready to answer is received from that other exchange, then transmits a call-charging start message to the new host exchange.

(7) In the configuration (1), when a call setup message is received from another exchange, the emulation processor in the old host exchange transmits a message containing call setup information to the new host exchange, and when the message is received, the emulation processor in the new host exchange checks called subscriber information, and transmits to the old host exchange a message containing information signifying the result of the check and ringing start and a message containing a ringing and path connection instruction.

(8). In the configuration (1), the old host exchange has a local exchange number of its own and is provided with a stand-alone capability for performing connection processing independently of the new host exchange, and if the new host exchange accommodating the old host exchange fails, the old host exchange switches in the stand-alone capability to perform basic call processing, including processing of calls arising between the subscribers accommodated in the old host exchange and subscribers accommodated in other exchanges.

BRIEF DESCRIPTION OF THE DRAWINGS

The present invention will be more clearly understood from the description as set forth below with reference to the accompanying drawings.

FIG. 7 is a diagram showing the configuration of an EmRSU processor in the old host.

FIG. 9 is a diagram showing the detailed configuration of a subscriber/RSU signal receiving section.

FIG. 10 is a diagram showing the configuration of a calling subscriber identification number translation section.

FIGS. 11A to 11C are diagrams showing the structures of translation tables.

FIG. 12 is a diagram showing the configuration of an EmRSU processor in the new host.

FIG. 14 is a diagram showing the detailed configuration of an EmRSU signal receiving section.

FIG. 19 is a diagram showing a control sequence from the transmission of an ACM message to the transmission of a REL message in accordance with the EmRSU method of the present invention.

FIG. 20 is a diagram showing the configuration of the EmRSU processor in the old host, including the various messages transferred to and from the destination exchange.

FIGS. 21A to 21D are diagrams showing the formats of the various EmRSU messages used in the control sequence of FIG. 19.

FIG. 22 is a diagram showing the configuration of the EmRSU processor in the new host, including the various messages transferred to and from the old host.

FIGS. 23A to 23C are diagrams showing the formats of the EmRSU messages sent from the new host to the old host.

FIG. 25 is a diagram showing a migration flow (part 1) when accommodating an old host in an intraoffice configuration according to the prior art.

DESCRIPTION OF THE PREFERRED EMBODIMENTS

Figure 4:
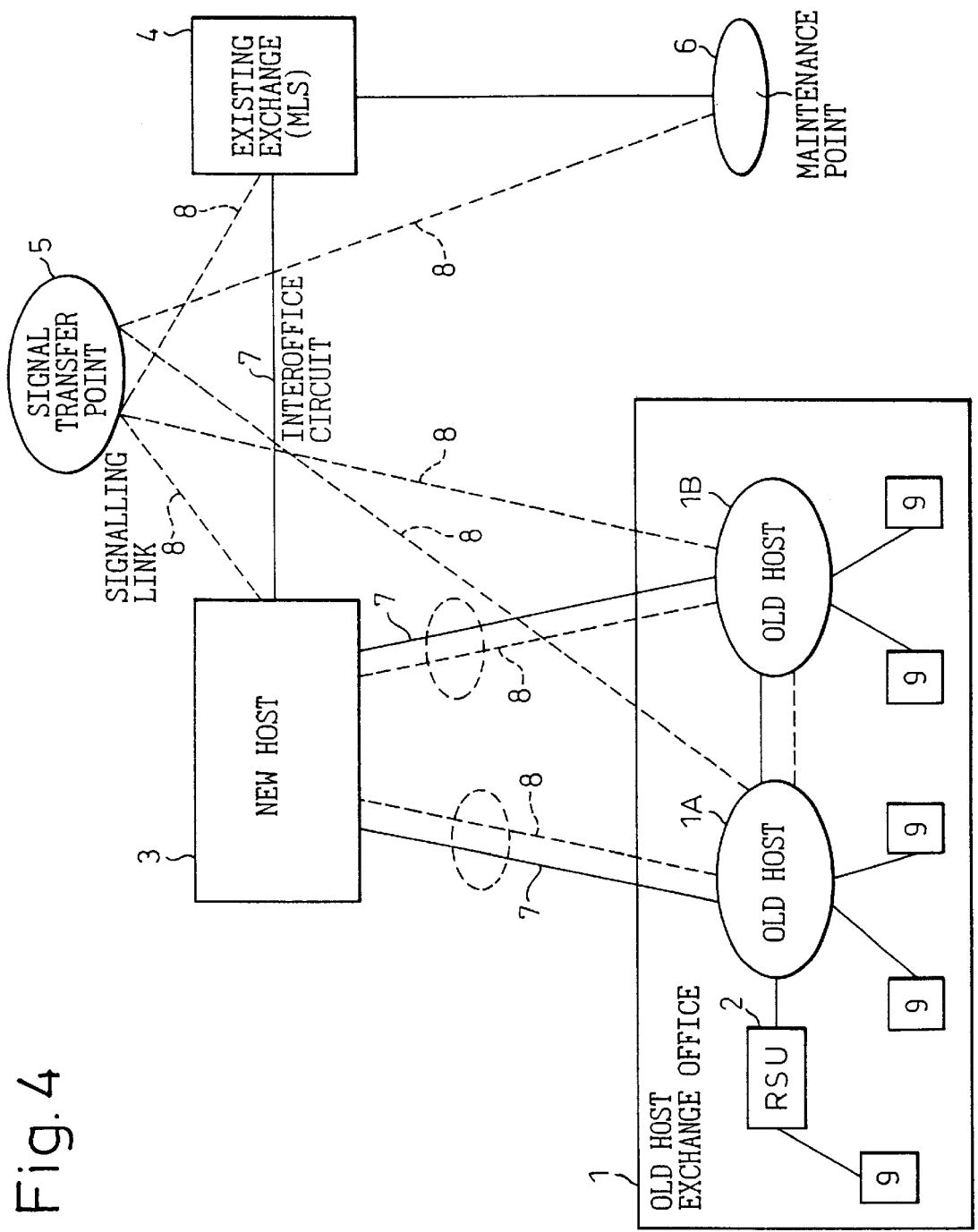
FIG. 4 is a diagram showing a system configuration according to the present invention.

FIG. 4 is a diagram showing a system configuration according to the present invention. In FIG. 4, reference numeral 1 is an old host exchange office in which old exchanges are accommodated by an emulated RSU (abbreviated EMRSU) method; 1A and 1B indicate two old host exchanges (each designated as the old HOST) located in the exchange office 1, and control processing of the exchanges 1A and 1B is not performed by the respective exchanges, but by a new host exchange 3. Reference numeral 2 is a remote switch unit (RSU) attached to the old host exchange 1A; 3 is the new host exchange which can accommodate a large number of subscribers, and which performs control processing not only for the subscribers accommodated therein, but also for the subscribers of the old hosts 1A and 1B accommodated by the emulation (EmRSU) method; 4 is an existing exchange office (designated as MLS which is an exchange office incorporating the functions of local switches (LSs) and local tandem switches) which has a tandem switching function and includes exchanges accommodating subscribers; 5 is a signal transfer point; 6 is a maintenance point; 7 are inter office lines for voice communication; 8 are signaling links for transferring signaling messages; and 9 are subscriber terminals.

In the configuration of FIG. 4, the old host exchanges 1A and 1B in the old host exchange office 1 use old hardware such as the subscriber circuits, lines, switches, etc. originally provided therein, and delegates the call processing control to the new host exchange 3; that, is, the relations between the conventional remote switch unit (RSU) 2 and its host exchange are emulated between the old host exchanges 1A, 1B and the new host exchange 3, and hence the name of the EmRSU method. The RSU 2 accommodated in the old host exchange 1A is controlled by the new host exchange 3 via the old host exchange 1A.

Figure 5:
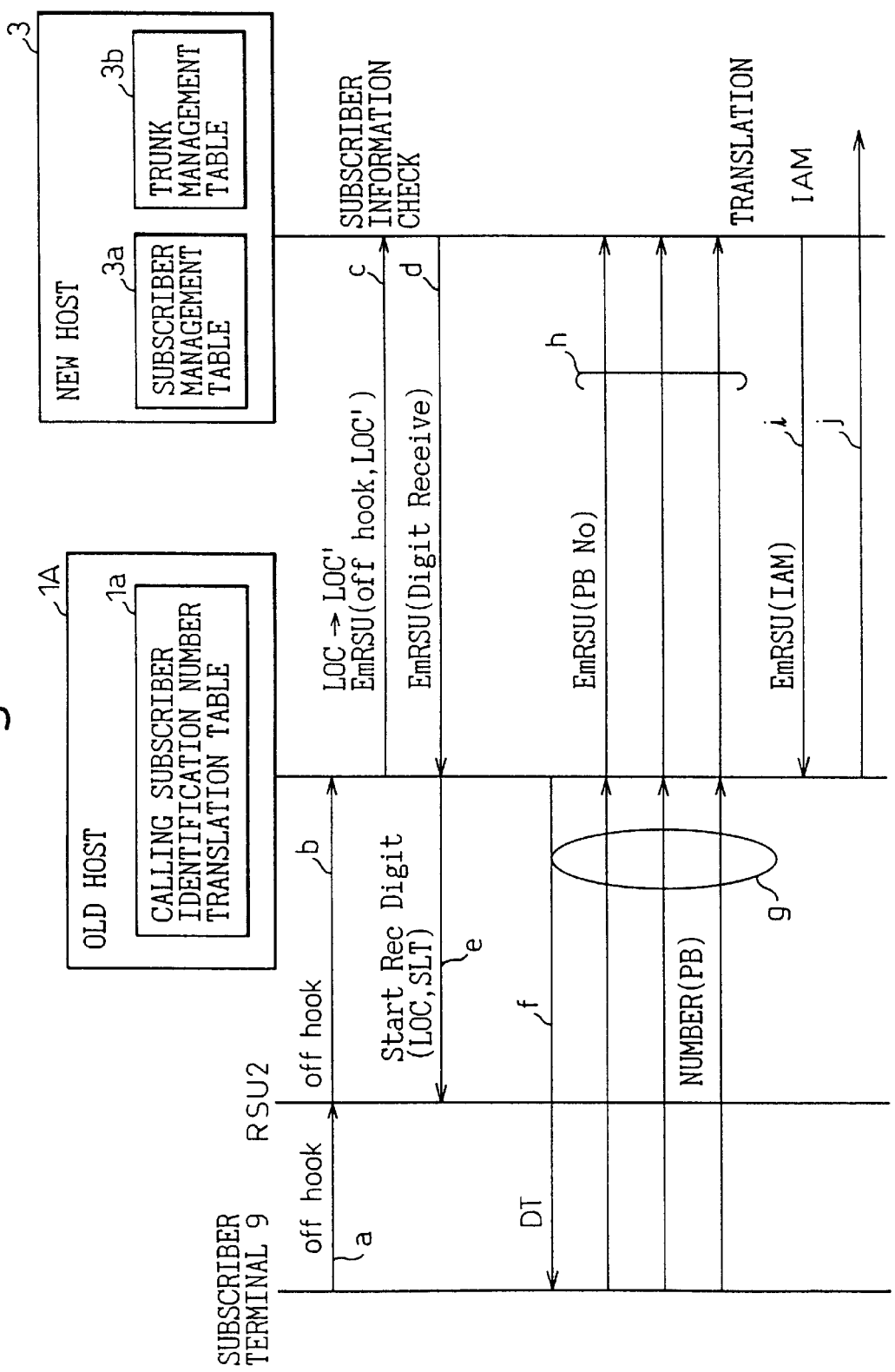
FIG. 5 is a diagram showing a control sequence for processing a call originating from an old host according to the present invention.

FIG. 5 shows a control sequence for processing a call originating from the old host. This control sequence illustrates how the call connection control is performed with the various parts interoperating in the system configuration of FIG. 4 based on the principle of the emulation (EmRSU) method of the present invention.

In FIG. 5, RSU 2 indicates the remote switch unit (RSU) 2 in FIG. 4, OLD HOST 1A designates the old host exchange 1A in FIG. 4, NEW HOST 3 denotes the new host exchange 3 in FIG. 4, and TERMINAL 9 represents a subscriber terminal (telephone terminal subscriber) attached to the RSU. The call connection is controlled by the new host exchange by transferring messages through the signaling link 8.

When the subscriber terminal 9 attached to the RSU 2 goes off-hook to initiate a call (a in FIG. 5), the off-hook condition is detected by the RSU 2, and an off-hook signal carrying a subscriber identifier (TEI) is sent to the old host exchange (hereinafter simply referred to as the old host) 1A (b in the figure). The old host 1A retrieves calling subscriber identification number (LCC) from an existing table used to translate the subscriber identifier (TEI) into the calling subscriber identification number (LCC), searches a new/old host calling subscriber identification number translation table 1a, newly-provided in the old host, and translates LCC into the calling subscriber identification number (LCC') used at the new host; then, using the EmRSU function, the old host 1A transmits to the new host exchange 3 (hereinafter simply referred to as the new host) a message created in accordance with the emulation method of the present invention and carrying both LCC' and an off-hook notification signifying the off-hook condition of the calling subscriber terminal 9 (c in the figure) (a message thus created will hereinafter be referred to as an EmRSU message, and the formats of various EmRSU messages will be described later with reference to FIGS. 8, 13, 21, etc.). Upon receiving this message, the new host 3 searches a subscriber management table 3a by using LCC' and retrieves subscriber information which is analyzed.

After analyzing the information, an EmRSU message (Digit Receive), carrying a subscriber line trunk number (SLT') and calling subscriber identification number (LCC') managed at the new host 3 and necessary for the reception of a destination number, is sent to the old host 1A to request transmission of the telephone number (d in the figure). Using the table 1a, the old host 1A translates the received numbers (LCC' and SLT') into the corresponding numbers (LCC and SLT) at the old host, and sends a destination number receive signal (Start Receive Digit) to the RSU 2 in accordance with the D channel protocol of ISDN, as in the prior art system.

Thus a line from the old host 1A to the calling subscriber terminal 9 is connected and a DT (dial tone) is transmitted, prompting the calling subscriber to enter a destination number (f in the figure); when the subscriber enters a destination number in response to the dial tone (g in the figure), the destination number is sent as an EmRSU message (PB number) to the host 3 over the connected line (h in the figure). After number translation and analysis at the new host 3, the new host creates an IAM (Initial Address Message), a message to be transmitted from the old host 1A to the destination exchange, acquires from an old host interoffice trunk management table 3b an interoffice trunk at the old host 1A side which is to transmit the IAM, and sends an EmRSU (IAM) message carrying these pieces of information therein to the old host 1A (i in the figure). Upon receiving the EmRSU (IAM), the old host 1A sends the IAM to the exchange of the destination subscriber over the old host interoffice trunk (j in the figure). In the case of the subscriber transmitting DP (dc pulses), the RSU translates the DP pulses into number information before transmitting it to the old host 1A.

Figure 1:
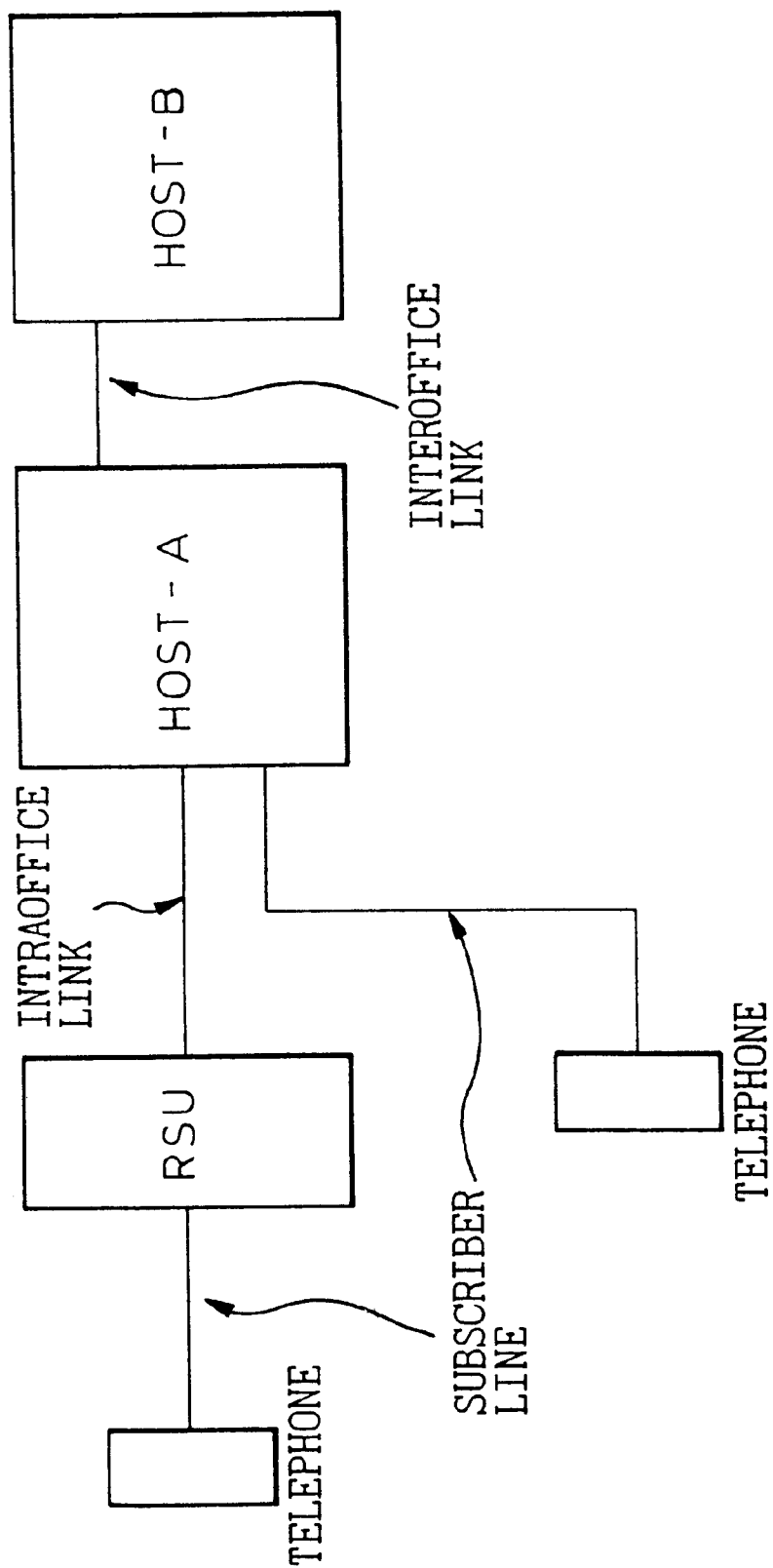
FIG. 1 is a diagram showing the system configuration of an exchange network.
Figure 2:
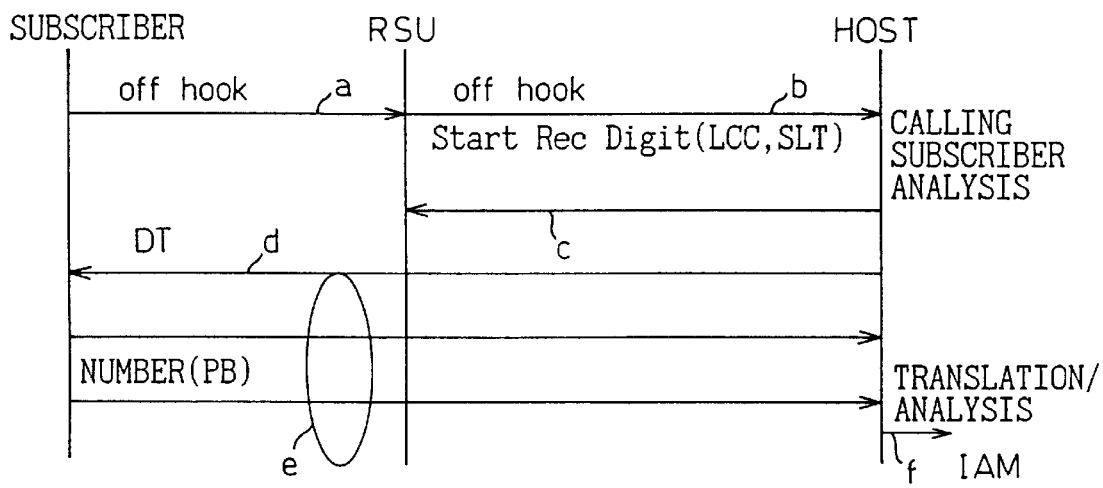
FIG. 2 is a diagram showing an operational sequence for processing a call initiated by a subscriber in an RSU according to the prior art.
Figure 3:
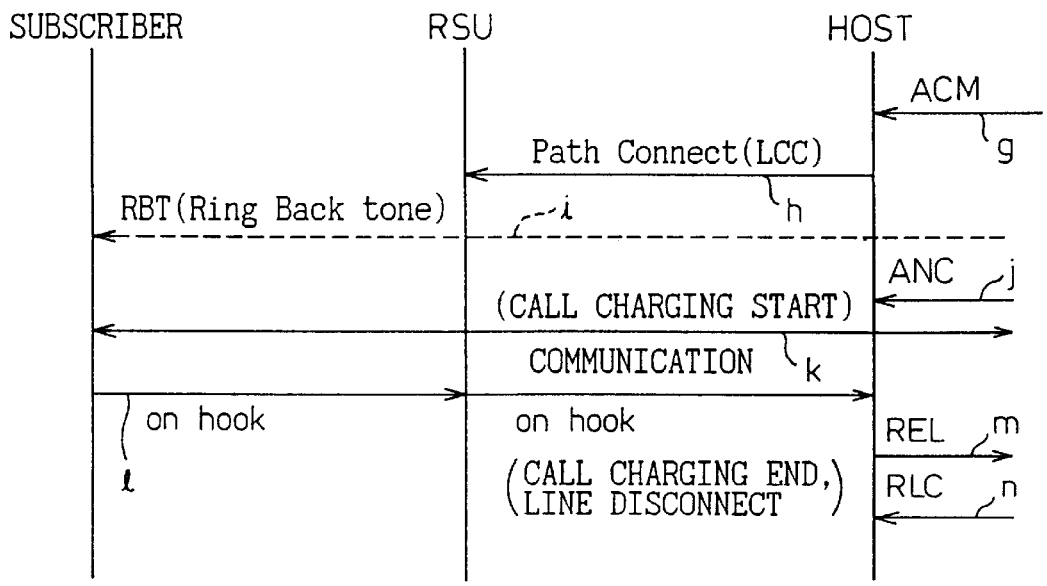
FIG. 3 is a diagram showing an operational sequence after an IAM in FIG. 2 is sent out, until the line is disconnected.
Figure 6:
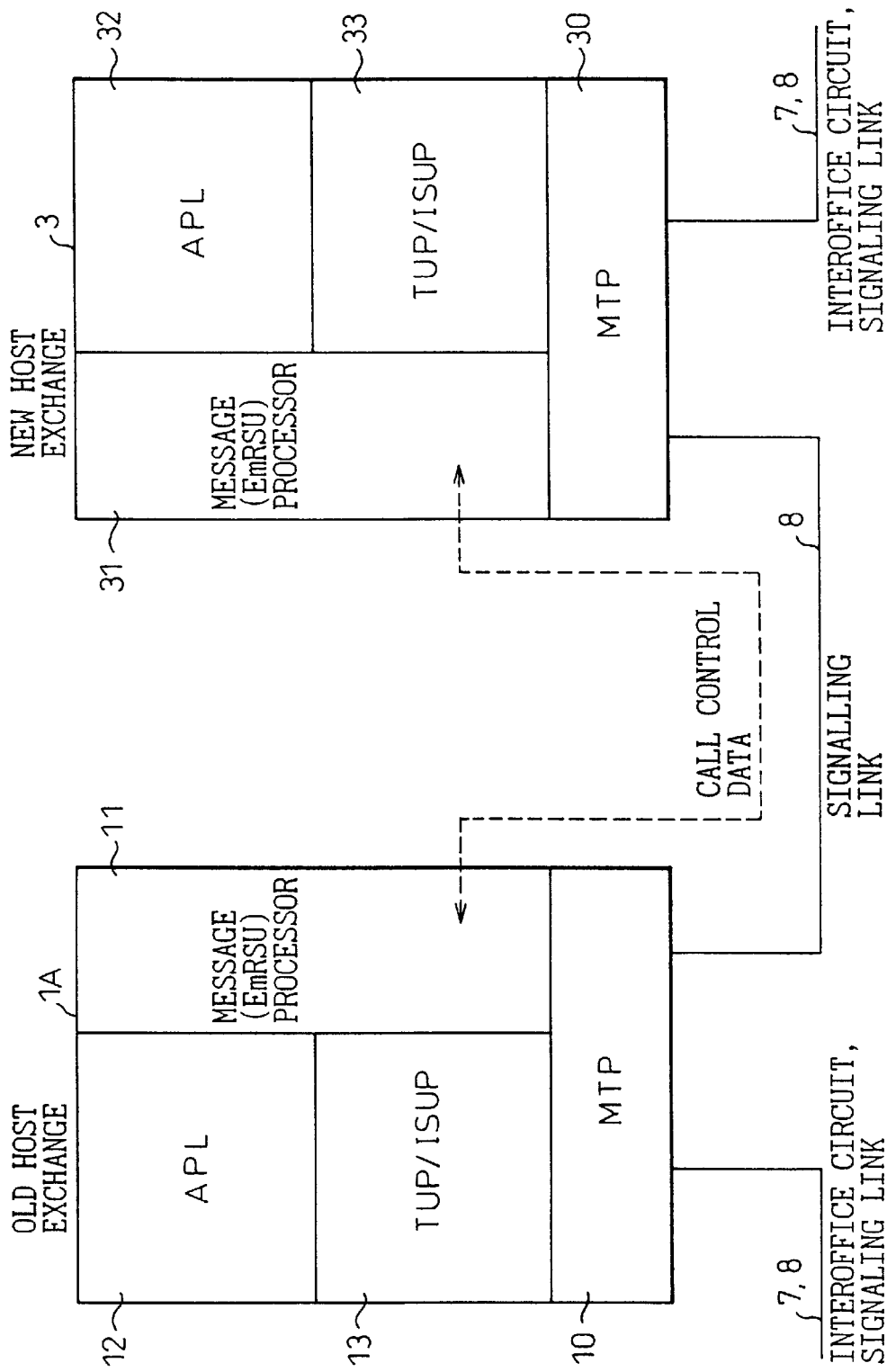
FIG. 6 is a diagram showing the software configuration of the old host exchange and a new host exchange.

FIG. 6 shows the software configuration of the old host exchange and new host exchange; in the figure, 1A indicates the old host exchange within the exchange office implemented by the EmRSU method (1B in FIG. 1 has the same configuration), 3 designates the new host exchange, 7 is an interoffice line, and 8 is a signaling link including a Common Channel Signaling System No. 7 link.

To implement the emulation (EmRSU) method of the present invention, the old host exchange 1A and the new host exchange 3 incorporate, as processing functions defined in the ITU-T (International Telecommunication Union Telecommunication Standardization Sector) recommendations, MTP (Message Transfer Part) indicated at 10 and 30 for performing message transfers via the signaling link 8 and TUP (Telephone User Part)/ISUP (ISDN User Part) indicated at 13 and 33 for performing protocol processing for telephone users and ISDN users. Reference numerals 12 and 32 each indicate a call processing application (designated as APL), and emulation (EmRSU) processors 11 and 31, whose internal configuration is described later, are provided as facilities for implementing the emulation (EmRSU) method of the present invention. The APL 12 and TUP/ISUP 13 in the old host exchange 1A are processing facilities used to provide the stand-alone capability of the old host exchange (for exchange processing of calls among the subscribers accommodated in the old exchange in case the new host exchange becomes unable to provide the necessary control).

The following describes the conditions required for an exchange to be accommodated in an exchange of the RSU emulation type.

The old host exchange 1A is an exchange that is located at an end of the network, and that directly accommodates subscribers; the exchange is already performing communication operations in the network, and accommodating the exchange in the emulated configuration does not cause interruptions in the services provided to the subscribers served by the exchange; and any software changes resulting from service addition, change, etc. are made only at the new host exchange 3 side, not at the old host exchange 1A side accommodated by the emulation method.

As shown in FIG. 6, the emulation (EmRSU) processors 11 and 31 are placed at a level above the standard communication software indicated by MTP 10 and 30, and processing is performed using the software of the emulation (EmRSU) processor 31 at the new host 3, instead of the application at the old host 1A. The emulation (EmRSU) processors 11 and 31 have the following functions.

(1) Basic call control that should normally be performed at the old host exchange 1A is performed at the new host exchange 3.

(2) Processing results of the basic call control and related information are transferred from the new host 3 to the old host 1A so that it appears as if the call control were performed at the old host 1A.

(3) To exchange the processing results and related information between the new and old hosts 1A and 3, messages used exclusively between the emulation (EmRSU) processors 11 and 31 are edited and exchanged, and necessary portions are extracted from the received messages for processing. Normally, the message exchange between the new and old host exchanges should not be made visible to the outside, but this can be accomplished without any problem by using the emulation (EmRSU) function.

The control sequence shown in FIG. 5 is accomplished by providing the software processors shown in FIG. 6 in the new host 3 and old host 1A, respectively. The configuration of each processor will be described below.

FIG. 7 shows the configuration of the EmRSU processor (corresponding to the emulation processor in FIG. 6) provided within the old host (1A in FIG. 6). In the figure, reference numeral 110 is a subscriber/RSU signal receiving section, 111 is a calling subscriber identification number translation section, and 112 is an EmRSU message processing section. The left-hand side of FIG. 7 (where the subscriber/RSU signal receiving section 110 is located) is connected to a section for transferring signals (off-hook signal, dial number, dial tone instruction, etc.) to and from the various existing parts such as the TUP/ISUP 13 and APL 12 shown in FIG. 6, and the right-hand side (where the EmRSU message processing section 112 is located) is connected to a section for transferring control signals to and from the new host.

The operation of FIG. 7 will be briefly described below with reference to the control sequence of FIG. 5 and the formats of EmRSU messages (on-hook and DN) shown in FIGS. 8A and 8B according to the present invention. When an off-hook signal is received from the subscriber, the subscriber/RSU signal receiving section 110 extracts the subscriber identification number (LCC) from the subscriber identifier (TEI) contained in the signal, and transfers the subscriber identification number (LCC) to the calling subscriber identification number translation section 111. The calling subscriber identification number translation section 111 translates the subscriber identification number (LCC) used at the old host exchange into the subscriber number (LCCI.) for use in the new host exchange, and transfers it to the EmRSU message processing section 112. The EmRSU message processing section 112 then transmits the EmRSU off-hook message to the new host 3 (c in FIG. 5).

Figure 8A:
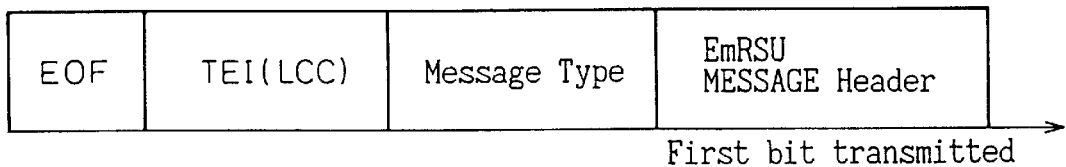
FIG. 8A and 8B are diagrams showing the formats of EmRSU messages (on-hook and DN).
Figure 8B:
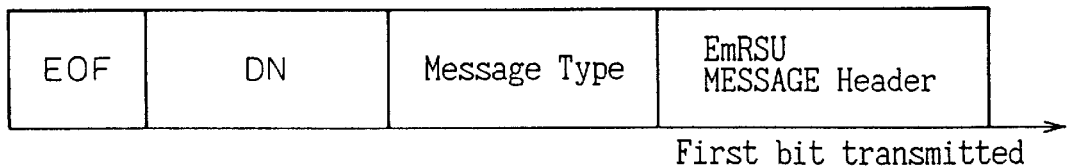

The format of this EmRSU message is shown in FIG. 8A. The EmRSU message header carries a call identification number, and the Message Type field carries the message type indicating the off-hook signal. The TEI (LCC) field contains the calling subscriber identifier, and EOF (End of File) indicates the end of the message.

The EmRSU message processing section (112 in FIG. 7) at the old host edits and processes EmRSU messages to be sent to the new host. The EmRSU message processing section 112 also receives and processes EmRSU messages sent from the new host and delivers the messages to the calling subscriber identification number translation section 111 or the subscriber/RSU signal receiving section 110.

When the EmRSU (Digit Receive) message carrying LCC' (subscriber identification number appended at the new host) and SLT' (subscriber line trunk number appended at the new host) is received from the new host, the EmRSU message processing section 112 translates the numbers into, the subscriber identification number (LCC) and subscriber line trunk number (SLT) used at the old host, and issues a dial signal receive start (Start Rec Digit) message which is transmitted to the subscriber via the subscriber/RSU signal receiving section 110. When the subscriber sends the destination number (PB) in response, the subscriber/RSU signal receiving section 110 receives the number and transfers it to the EmRSU message processing section 112 which then outputs EmRSU (DN) (obtained from EmRSU(PB) shown at h in FIG. 5), a message-containing the dial number, for transmission to the new host. When, in response, the EmRSU (IAM) message transmitted from the new host 3 is received by the EMRSU message processing section 112, the IAM is sent out onto the trunk connected to the destination exchange.

FIG. 9 shows the detailed configuration of the subscriber/RSU signal receiving section (110 in FIG. 7). In FIG. 9, reference numeral 110a is a signal receiving part which distributes signals between a calling subscriber identification number translation interface 110b and an old host call processing interface 100c, described hereinafter, when an off-hook detection event, a PB (dual tone dialing) signal, or a number according to an individual signaling scheme such as DP (dc dial pulses), is input, 110b is the calling subscriber identification number translation interface having the function of extracting the calling subscriber identification number (LCC) from the subscriber terminal identifier (TEI), and 110c is the old host call processing interface having the function of translating the destination number (DN) into the number of the destination exchange. The output of the calling subscriber identification number translation interface 110b is supplied to the calling subscriber identification number translation section 111 which is a new processing section provided at the old host 1A. The number output from the old host call processing interface 110c is supplied to the EmRSU message processing section 112.

FIG. 10 shows the configuration of the calling subscriber identification number translation-section (111 in FIG. 7). In the calling subscriber identification number translation section 111, when the calling subscriber identification number (LCC) is input from the subscriber/RSU signal receiving section 110, an LCC/LCC' translation part 111a translates it into the calling subscriber identification number (LCC') for use in the new host exchange by using a translation table 111b, or translates the LCC' input from the EmRSU message processing section 112 back into LCC by using an inverse translation table 111c. An SLT/SLT' translation part 111d translates the subscriber line trunk number (SLT) used at the old host into the subscriber line trunk number (SLT') for use in the new host by using a translation table 111e, or translates the subscriber line trunk number (SLT') used at the new host back into the subscriber line trunk number (SLT) for use in the old host;by using an inverse translation table 111f.

FIGS. 11A to 11C show the structures of the respective translation tables. FIG. 11A shows the LCC/LCC' translation table (111b in FIG. 10). Normally, the calling subscriber identification number (LCC) should only be held in the host, but since the calling subscriber line is connected to the old host, it is first identified as LCC at the old host. However, the subscriber line identification number at the new host is assigned independently of that at the old host, and LCC by itself cannot carry the calling subscriber information. According, this translation table is used so that the calling subscriber information is managed using the subscriber line identification number (LCC') managed at the new host. The LCC'/LCC inverse translation table (111c in FIG. 10) is provided (not shown) based on the same principle as FIG. 11A.

FIG. 11B shows the SLT/SLT' translation table (111e in FIG. 10). The subscriber line trunk (SLT) also is treated based on the same principle as that for the LCC. That is the subscriber line trunk must also be managed at the new host, but since the SLT is actually provided at the old host side, the correspondence between the SLT at the old host and the SLT management at the new host must be determined, and for this purpose, this translation table is used. FIG. 11C shows the SLT'/SLT inverse translation table (111f in FIG. 10).

Next, the detailed configuration of the new host (3 in FIG. 6) will be described with reference to drawings.

FIG. 12 shows the configuration of the EmRSU processor (corresponding to the emulation processor 31 in FIG. 6) in the new host. In the figure, reference numeral 310 is an EmRSU signal receiving section, 311 is a calling subscriber terminal information management section, and 312 is an RSU call processing section, comprising parts 313 to 315, for processing a call originating from the old host. Reference numeral 313 is an EmRSU message processing part, 314 is a translation part, and 315 is an old host interoffice trunk management part.

The operation of FIG. 12 will be briefly described with reference to the control sequence of FIG. 5 and the formats of the EmRSU messages (Digit Receive and IAM) shown in FIG. 13 according to the present invention. When the EmRSU (off-hook) message or EmRSU(PB) or EmRSU (DN) message is received from the old host, the EmRSU signal receiving section 310 extracts the subscriber identification number (LCC') contained in the message, and transfers it to the calling subscriber terminal information management section 311. The calling subscriber terminal information management section 311 retrieves the subscriber information by using the subscriber identification number (LCC'), and supplies it to the EmRSU message processing part 313 which then generates the EmRSU (Digit Receive) message carrying the instruction for the reception of the dial number including the subscriber information.

Figure 13A:
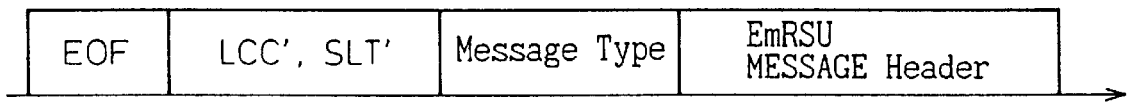
FIGS. 13A and 13B are diagrams showing the formats of EmRSU messages (Digit Receive and IAM).

The format of this message is shown in FIG. 13A. A Digit Receive signal is set as the Message Type, and LCC' and SLT', based on which the dial number is detected, are set as the contents of the message.

Figure 13B:
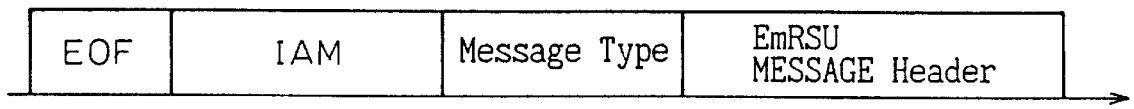

When the dial number (PB) is received from the old host, the EmRSU signal receiving section 310 transfers it to the EmRSU message processing part 313, and the translation part 314 translates the number and creates IAM (Initial Address Message—call setup message). At this time, the old host interoffice trunk management part 315 detects interoffice trunk information necessary for connection from the old host to the destination exchange of the dialed number, and supplies the EmRSU (IAM) message to the EmRSU signal receiving section 310. FIG. 13B shows the format of the EmRSU (IAM) message. An IAM signal is set as the Message Type, and IAM is set as the contents of the message.

FIG. 14 shows the detailed configuration of the EmRSU signal receiving section (310 in FIG. 10). In FIG. 14, reference numeral 310 is the EmRSU signal receiving section, 310a is an EmRSU signal receiving part which distributes signals received from the old host 1A, 310b is a calling subscriber terminal management interface which extracts LCCI (the calling subscriber identification number of the old host managed at the new host) from the RSU (off-hook) message and transfers LCC' to the calling subscriber terminal information management section (311 in FIG. 12), and 310c is an EmRSU message processing interface which extracts the destination number from the RSU (DN: Number) message supplied from the old host 1A and transfers the destination number to the EmRSU message processing part (313 in FIG. 12).

Figure 15:
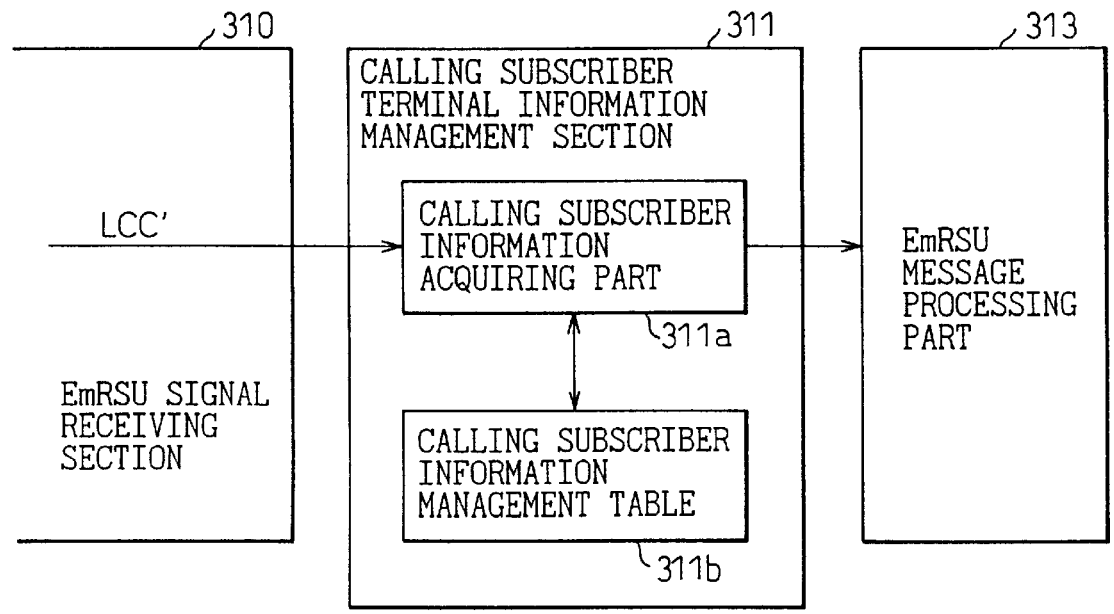
FIG. 15 is a diagram showing the detailed configuration of a calling subscriber terminal information management section.

FIG. 15 shows the detailed configuration of the calling subscriber terminal information management section (311 in FIG. 12). In the calling subscriber terminal information management section 311, when the calling subscriber identification number (LCC') of the old host managed at the new host is received from the EmRSU signal receiving section (310 in FIG. 12), a calling subscriber information acquiring part 311a retrieves the calling subscriber information from a calling subscriber information management table 311b (its structure is shown in FIG. 16 hereinafter described) and supplies it to the EmRSU message processing section 312.

Figure 16:
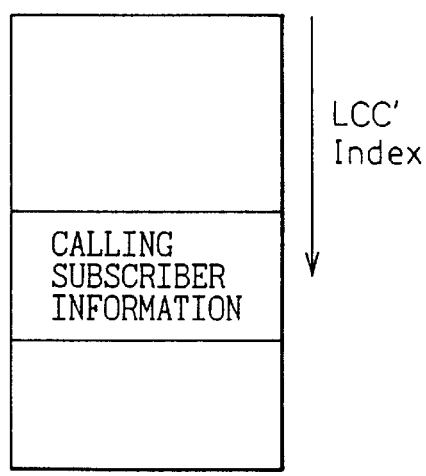
FIG. 16 is a diagram showing the structure of a calling subscriber information management table.

FIG. 16 shows the structure of the calling subscriber information management table (311b in FIG. 15). The calling subscriber information managed in this table is the same as the information, such as "PRIORITY/NONPRIORITY TYPE", "CALL RESTRICTION INFORMATION", etc., managed at the old host.

Figure 17:
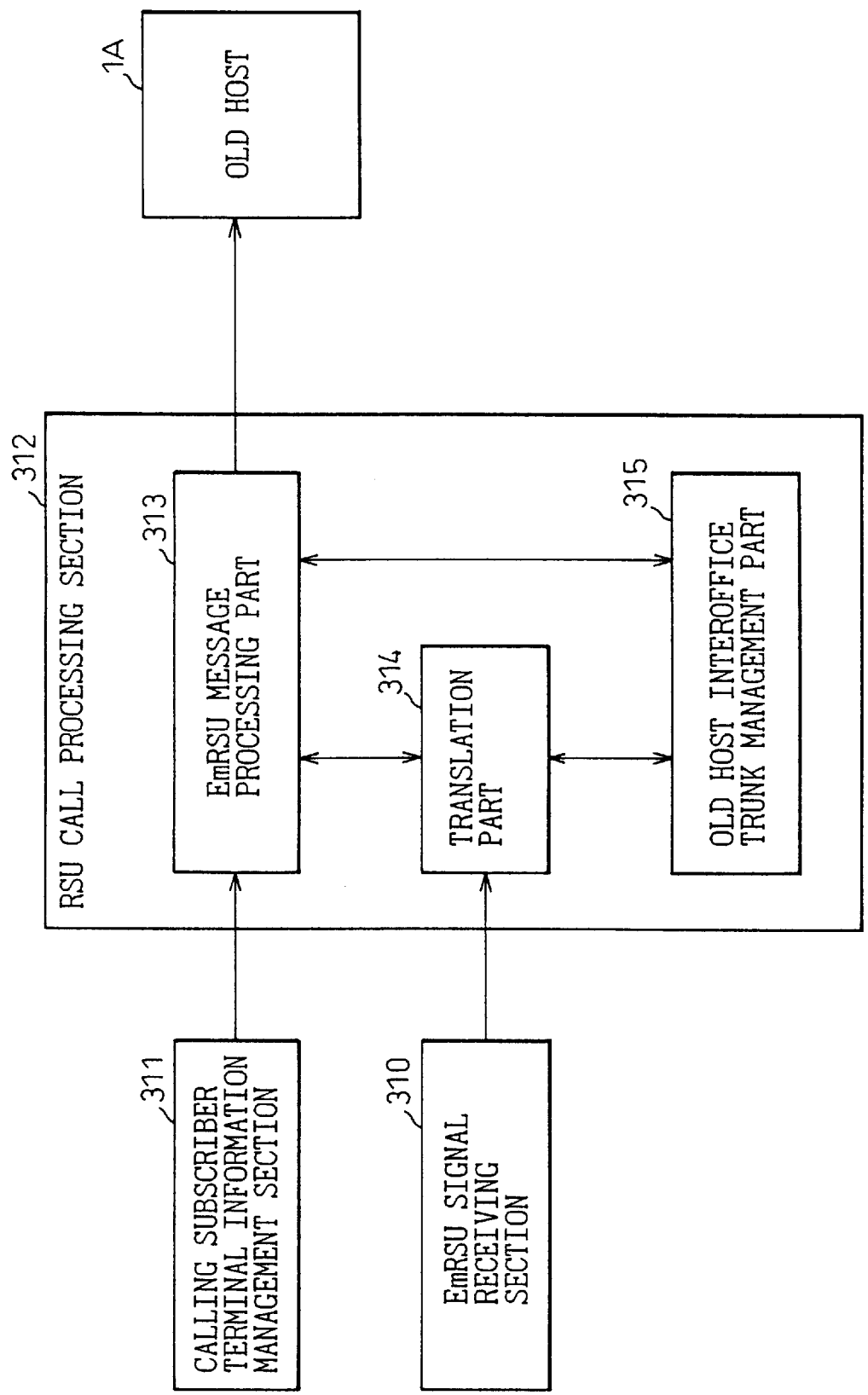
FIG. 17 is a diagram showing the configuration of an RSU call processing section and its relations with other sections.

FIG. 17 shows the configuration of the RSU call processing section (312 in FIG. 12) and its relations with other sections; reference numerals 310 to 315 in the figure designate the same sections as those shown in FIG. 12, and their descriptions will not be repeated here. In FIG. 17, the translation part 314, using a translator (not shown), translates the destination number (carried in RSU(DN)) input from the EmRSU signal receiving section 310, and acquires the service type, called subscriber information, etc. The translation part 314 also acquires, from the old host interoffice trunk management part 315, the availability of an open interoffice trunk for connection to the called subscriber, and performs the same processing as traditionally performed by the old host exchange. The old host interoffice trunk management part 315 manages trunk status such as the availability, blocking, failure, etc. of interoffice trunks at the old host side, and the trunk management information is appended to the IAM message (shown in FIG. 18 hereinafter given) created at the new host for transmission to the old host 1A. The EmRSU message processing part 313 edits the EmRSU message to be transmitted to the old host, and manages the status of the call initiated by the calling subscriber.

Figure 18:
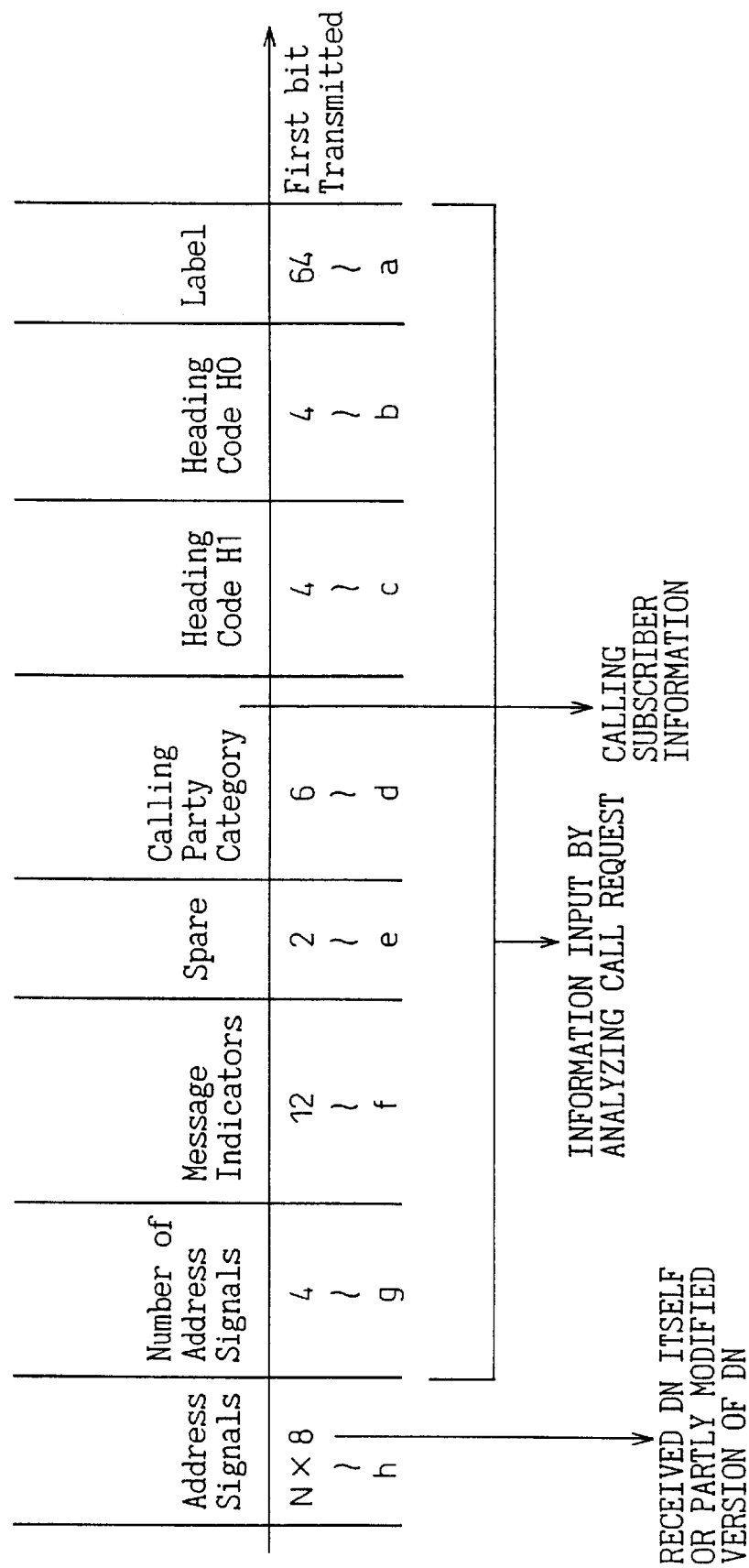
FIG. 18 is a diagram showing the format of an IAM message.

The IAM message created at the new host is included in the EmRSU message and transmitted to the old host, which then transmits it in the form of an ISUP message to the destination exchange; if it is determined that the connection to the called subscriber is possible, the destination exchange returns an ACM (Address Complete Message) to the originating exchange (in the case of the present invention, the old host). IAM is the message first sent when establishing a connection to a subscriber on other exchange. The format is shown in FIG. 18.

A label (64 bits in the illustrated example) indicated by at the head of the IAM contains the circuit identification code (CIC: 12 bits in this example) that identifies the communication circuit used for the call; in the present invention, the trunk information found by the old host interoffice trunk management part 315 is set in this field. Fields b and c of the IAM indicate the message group and message type, respectively, while d is the information indicating the type of the calling subscriber (public, general, etc.), e is reserved, f is the message identification number, g is the number of the address signal, and h is the destination number (N digits) which is the received DN itself or a partly modified version of it. The information carried in the a to g fields is obtained by analyzing the requested call.

After the IAM (call setup message) has been transmitted to the destination exchange in response to the call request from the subscriber by using the configuration shown in FIGS. 13 to 17, the control sequence shown in FIG. 19 is performed from the transmission of the ACM (Address Complete) message to the transmission of the REL (Release) message in accordance with the EmRSU method of the present invention. The subscriber terminal 9, RSU (remote switch unit) 2, old host. (HOST) 1A, and new host (HOST) 3 in FIG. 19 are the same as the corresponding elements designated by the same reference numerals in the control sequence shown in FIG. 5.

In FIG. 19, when the connection to the called subscriber is possible, the ACM message is delivered to the old host 1A (a in FIG. 19), in response to which the old host 1A returns an EMRSU message carrying the ACM therein to the new host 3 (b in the figure). Upon receiving this message, the new host 3 extracts the calling subscriber terminal identification number (LCC') to establish a path to the destination exchange, and sends a path connect instruction EmRSU message with the LCC' contained therein to the old host 1A (c in the figure). The old host 1A that received this message. translates the LCCI into LCC, outputs a path connection complete (Path Connect) to notify the RSU 2 that the path connection to the destination has been completed (d in the figure), and connects the ring back tone (RBT) being transmitted from the destination exchange (e in the figure). When the called subscriber goes off-hook (to answer), an ANC (Answer message Charge) message notifying that call charging should start is delivered to the old host 1A (f in the figure), whereupon the old host 1A sends an EmRSU message with ANC contained therein to the new host 3 (g ain the figure). Upon receiving the ANC, the new host 3 starts call charging, and the communication is thus started (h in the figure). When the communication ends, an on-hook signal from the subscriber terminal 9 is delivered to the old host 1A (i in the figure), which then sends an EmRSU message to the new host 3 to notify it of the reception of the on-hook signal (j in the figure). The new host 3 sends an EmRSU message, containing REL to be transmitted to the destination exchange, to the old host 1A (k in the figure) which thus transfers the REL to the destination exchange (1 in the figure). The new host ends the call charging, and sends a path disconnect to the old host, instructing it to release the path (m in the figure). Thereafter, the old host 1A sends a path release confirmed EmRSU message (disconnect Complete) to the new host. 3 (n in the figure), and the RLC delivered to the old host 1A is forwarded to the new host 3 in the form of an EmRSU message, thus releasing all resources.

The control sequence shown in FIG. 19 can be implemented with the new host collaborating with the old host, using the same EmRSU processor configuration as the EmRSU processor in the old host (FIG. 7).

FIG. 20 shows the configuration of the EMRSU processor in the old host, including the various messages transferred to and from the destination exchange; in the figure, reference numerals 110 to 112 are the same as those in FIG. 7, that is, 110 is the subscriber/RSU signal receiving section, 111 is the calling subscriber identification number translation section, and 112 is the EmRSU message processing section. Alongside the EmRSU message processing section 112 are shown the various messages transferred to and from the destination exchange as well as various message from other exchange.

FIGS. 21A to 21D show the formats of the various EmRSU messages used in the control sequence of FIG. 19. FIG. 21A shows the EmRSU (ACM) message, carrying call identification number in the EmRSU message-header, ACM signal as the message type in the Message Type field, and the ACM message in the ACM field. FIG. 21B shows the EMRSU (ANC) message, carrying call identification number in the EmRSU message header, ANC signal as the message type in the Message Type field, and the ANC (charge start) message in the ANC field. Further, FIG. 21C shows the EmRSU (on-hook) message carrying on on-hook signal as the message type in the Message Type field and LCC'/SLT' information in the corresponding field. FIG. 21D shows the EmRSU (disc comp) message carrying a disc comp (release complete) signal as the message type in the Message Type field.

FIG. 22 shows the configuration of the EMRSU processor in the new host, including the various messages transferred to and from the old host; in the figure, elements designated by reference numerals 310 to 312 are the same as those indicated by the same reference numerals in FIG. 12, that is, 310 is the EmRSU signal receiving section, 311 is the calling subscriber terminal information management section, 312 is the RSU call processing section for processing a call originating from the old host, 313 is the EmRSU message processing part, 314 is the translation part, and 315 is the old host interoffice trunk management part. The EmRSU signal receiving section 310 of the new host receives the various EmRSU messages (disc connect, ACM, ANC, on-hook, etc.), sent from the old host, shown in the control sequence of FIG. 19. The EmRSU message processing part 313 creates various EmRSU messages (path cot, REL, path disc, etc.) for transmission to the old host.

FIGS. 23A to 23C show the formats of the EmRSU messages created by the EmRSU message processing part 313 shown in FIG. 22 for transmission from the new host to the old host. FIG. 23A shows the EmRSU (path cot: path connection) message, carrying a call identification number in the EmRSU message header, a path cot signal as the message type in the Message Type field, and LCC'/SLT' information in the message field. FIG. 23B shows the EmRSU (REL: release) message, carrying a REL signal as the message type in the Message Type field and the Release message in the message field. Further, FIG. 23C shows the EmRSU (path disc: path disconnect) message, carrying a path-disc signal as the message type in the Message Type field.

Figure 24:
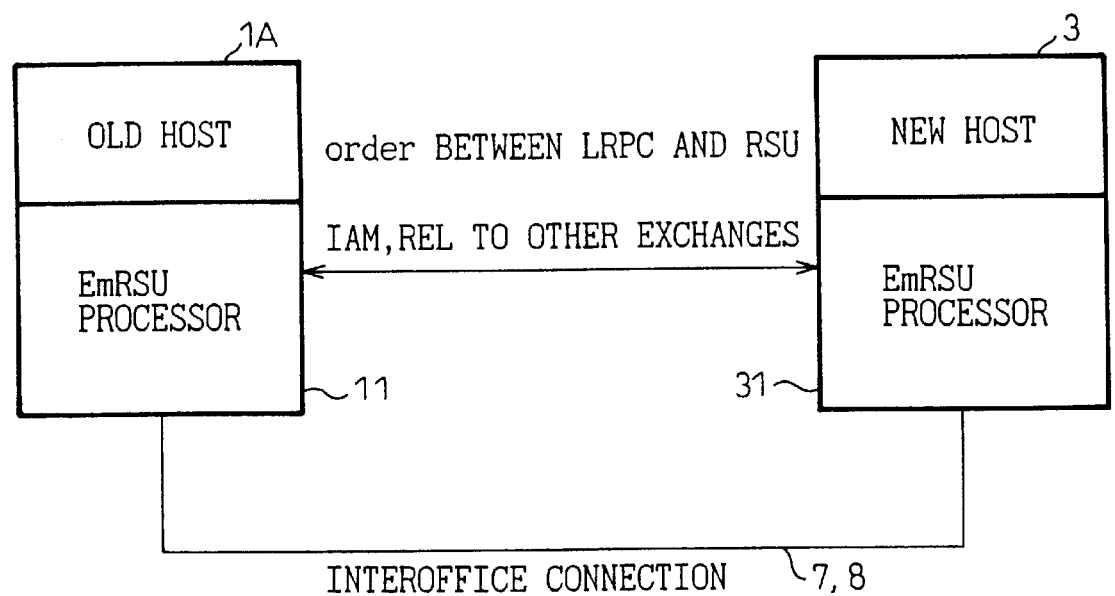
FIG. 24 is a diagram showing the arrangement of the EmRSU processors of the old host and new host.

FIG. 24 is a diagram showing the arrangement of the EmRSU processors of the old host and new host. As shown in FIG. 24, the EmRSU processor 11 of the old host and the EmRSU processor 31 of the new host are linked by an interoffice connection (interoffice line 7 and signaling link 8), and this interoffice connection is the key to smoothly accommodating the old host in the new host.

This is obvious when compared with the case where the RSU and the HOST are linked by an intraoffice connection (normally, this type of interfacing is standard). That is, if the old host were to be accommodated using an intraoffice connection, the following would have to be done before the old host could be accommodated.

(1) Changing the numbers of the subscribers accommodated in the old host (due to the change of the serving exchange)

(2) Changing translation data at all local switches (LSs) serving the subscribers (due to the change of the exchange serving the old-host subscribers)

Accomplishing the changes (1) and (2) would require a considerable amount of time and labor, since the number of subscribers accommodated in the old host is supposed to be about 80,000 at the maximum. Furthermore, when the intraoffice configuration is implemented by updating files (Generic Update, sometimes abbreviated GU), the original files must be restored from the GU' ed files in the event of an equipment failure or the like, but in the case of the intraoffice implementation, the changes (1) and (2) must be undone before restoring the files, the fatal drawback being that the files cannot be restored immediately because it takes time to undo the changes.

Figure 26:
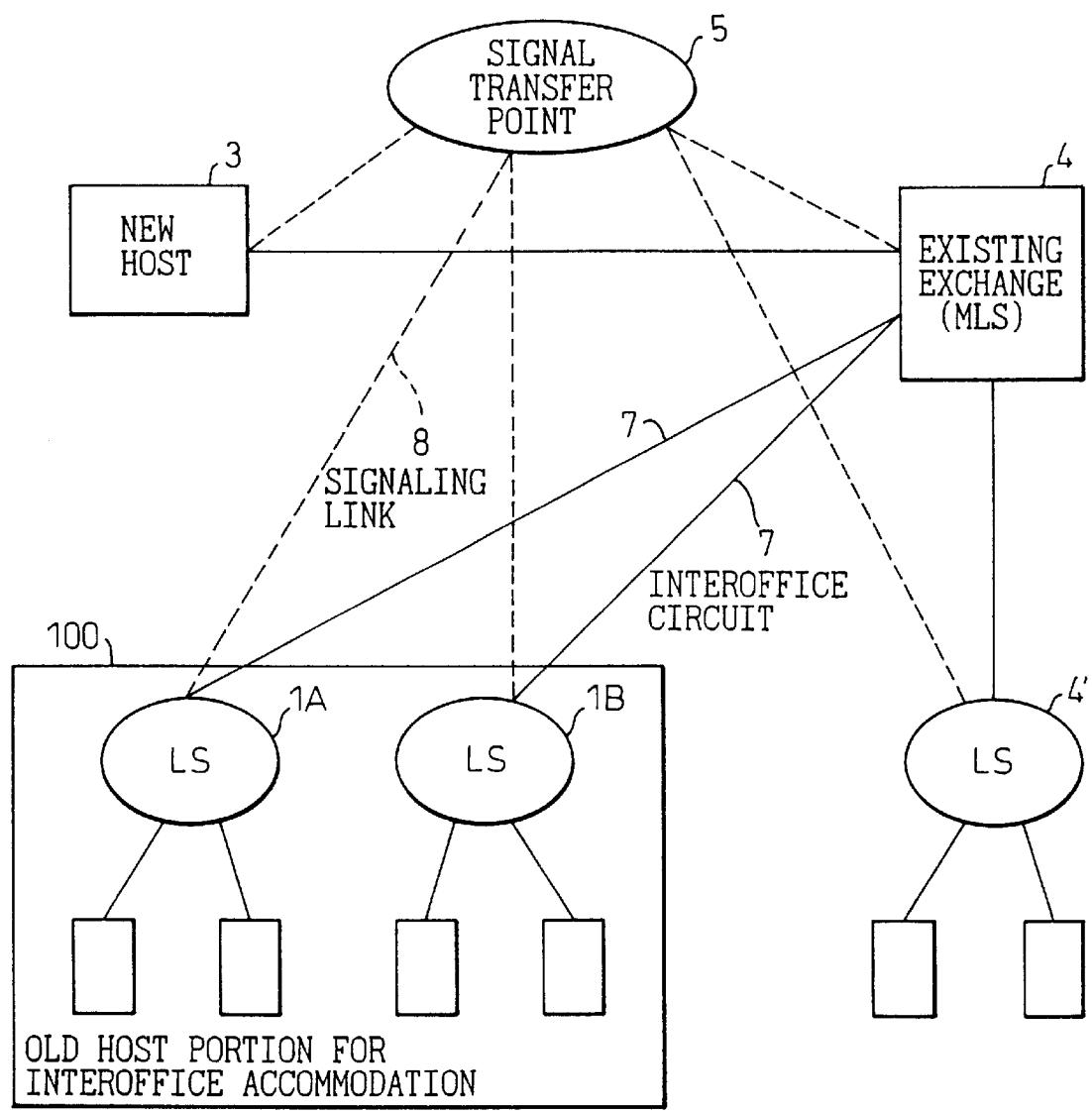
FIG. 26 is a diagram showing a migration flow (part 2) when accommodating an old host in an intraoffice configuration according to the prior art.
Figure 27:
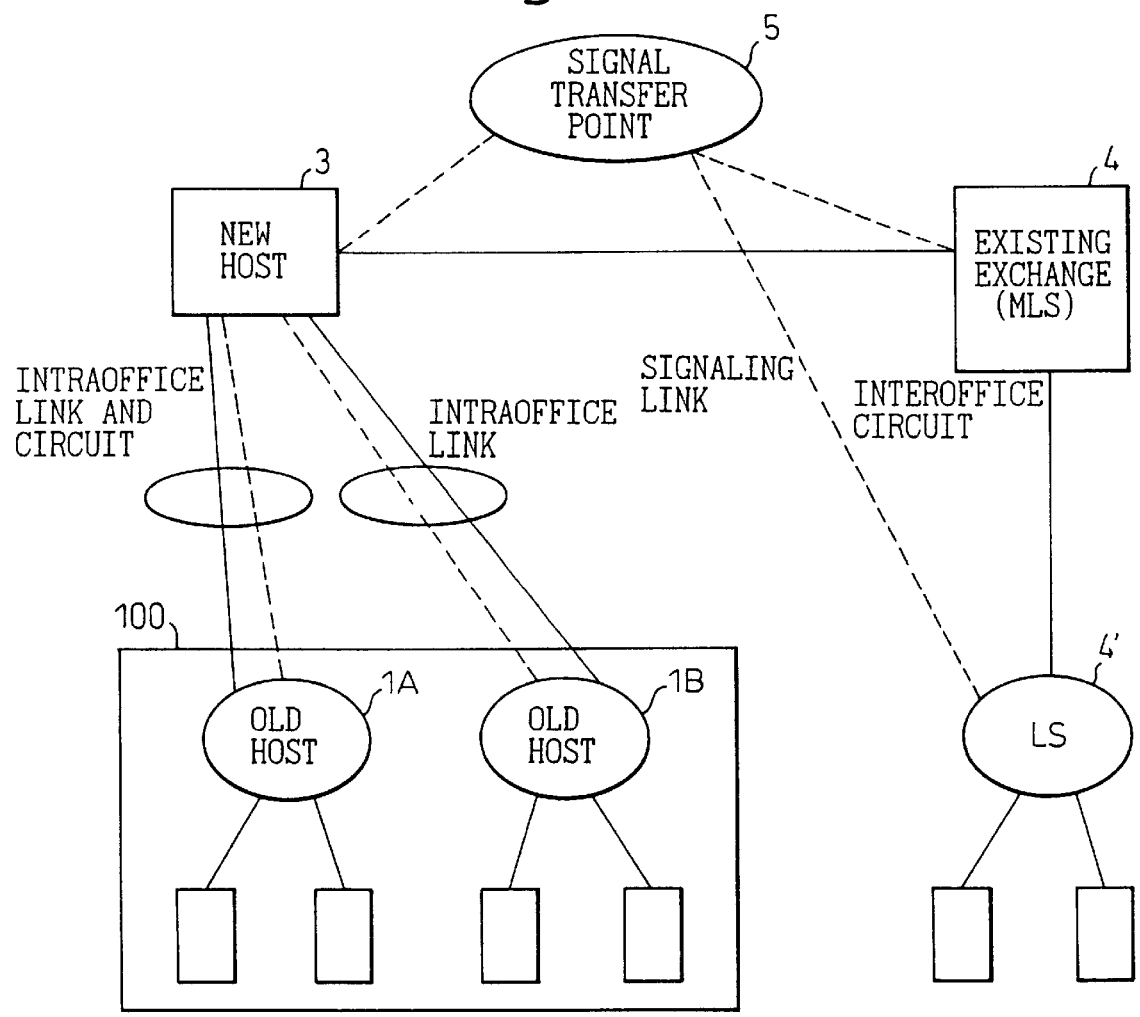
FIG. 27 is a diagram showing a migration flow (part 3) when accommodating an old host in an intraoffice configuration according to the prior art.

The problem arising when accommodating the old host in a newly installed host using an intraoffice connection will be explained with reference to diagrams illustrating migration flows. FIGS. 25 to 27 are migration flows (part 1) to (part 3), respectively, when accommodating the old host in an intraoffice configuration according to the prior art.

FIG. 25 shows the network configuration before the migration; in the figure, reference numeral 100 shows the old host portion that is supposed to be accommodated in an intraoffice configuration, and that includes two local switches (LSs) 1A and 1B. Reference numeral 3 indicates the new host exchange (designated as NEW HOST) to be added to the network, and 101 designates the entire block in which operation data need to be added in order to add the changed numbers of the subscribers served by the old host and accommodate them in the new host. Within the block 101, reference numeral 4 is the existing exchange (MLS), 4' is other existing LS, 5 is a signal transfer point, 7 are interoffice circuits, and 8 are signaling links.

As the first step of migrating to the new host 3, the numbers of the subscribers to be accommodated by the intraoffice connection are added to the LS 1A and LS 1B in the current exchange as well as to the neighboring existing exchanges 4 and 4'. At the same time, for incorporation into the network of the new host 3, data are added in all the exchanges in the block 101, but not in the old host. After that, the new host 3 is incorporated into the existing network, resulting in the configuration shown in FIG. 26. Subsequent to FIG. 26, intraoffice connection of the old host is done by updating files in the LSs (Generic Update which means changing software without changing the hardware); that is, the interoffice circuits and interoffice signaling links between the LSs 1A, 1B and the existing exchange office 4 are severed, and the LSs 1A and 1B are connected with the new host 3 by intraoffice links, thus accomplishing the intraoffice connection, as shown in FIG. 27. When the intraoffice connection is done in this manner, the subscribers accommodated in the LS 1A or LS 1B in the old host cannot connect to other exchanges without passing through the new host.

Figure 28:
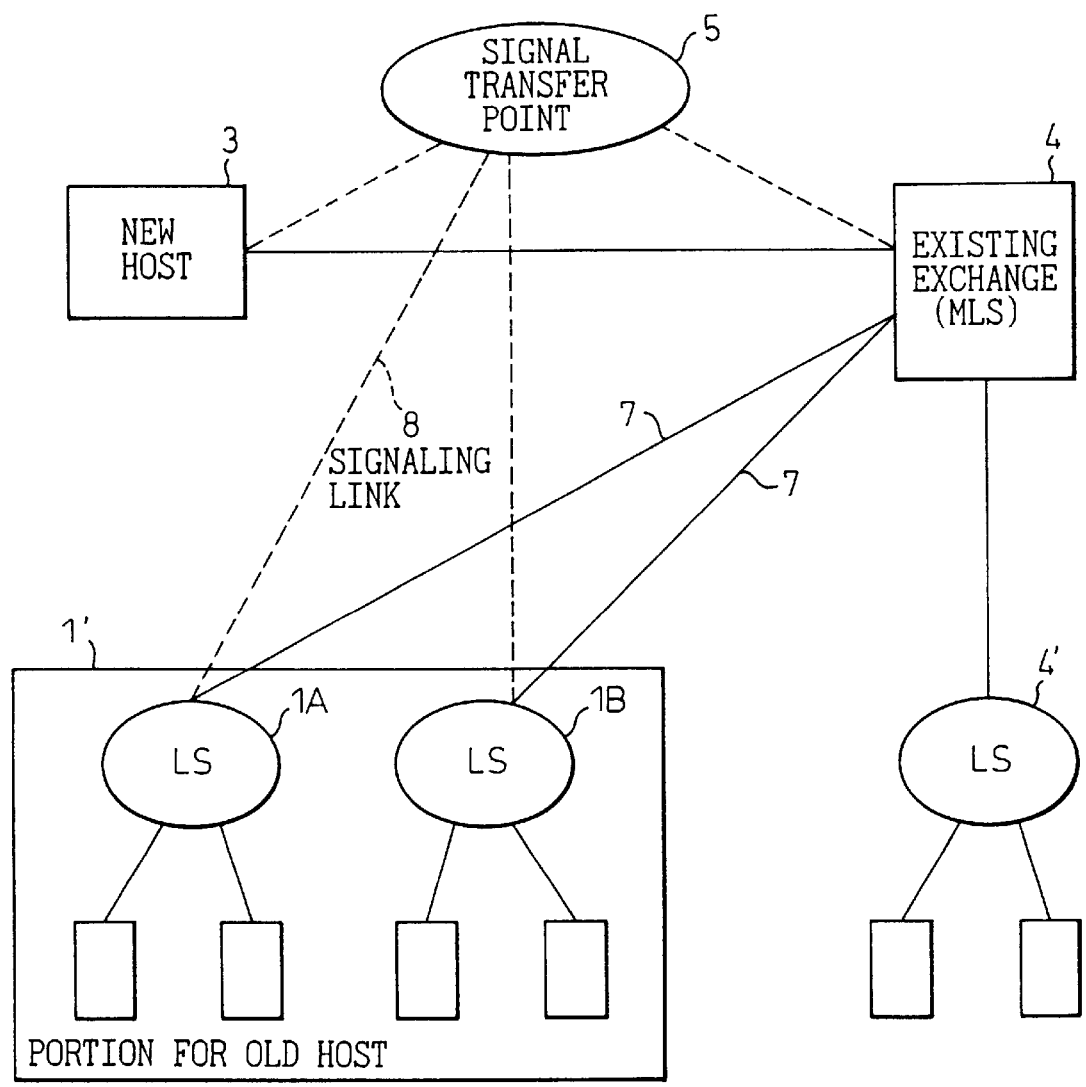
FIG. 28 is a diagram showing a migration flow (part 1) when implementing an interoffice configuration according to the present invention.
Figure 29:
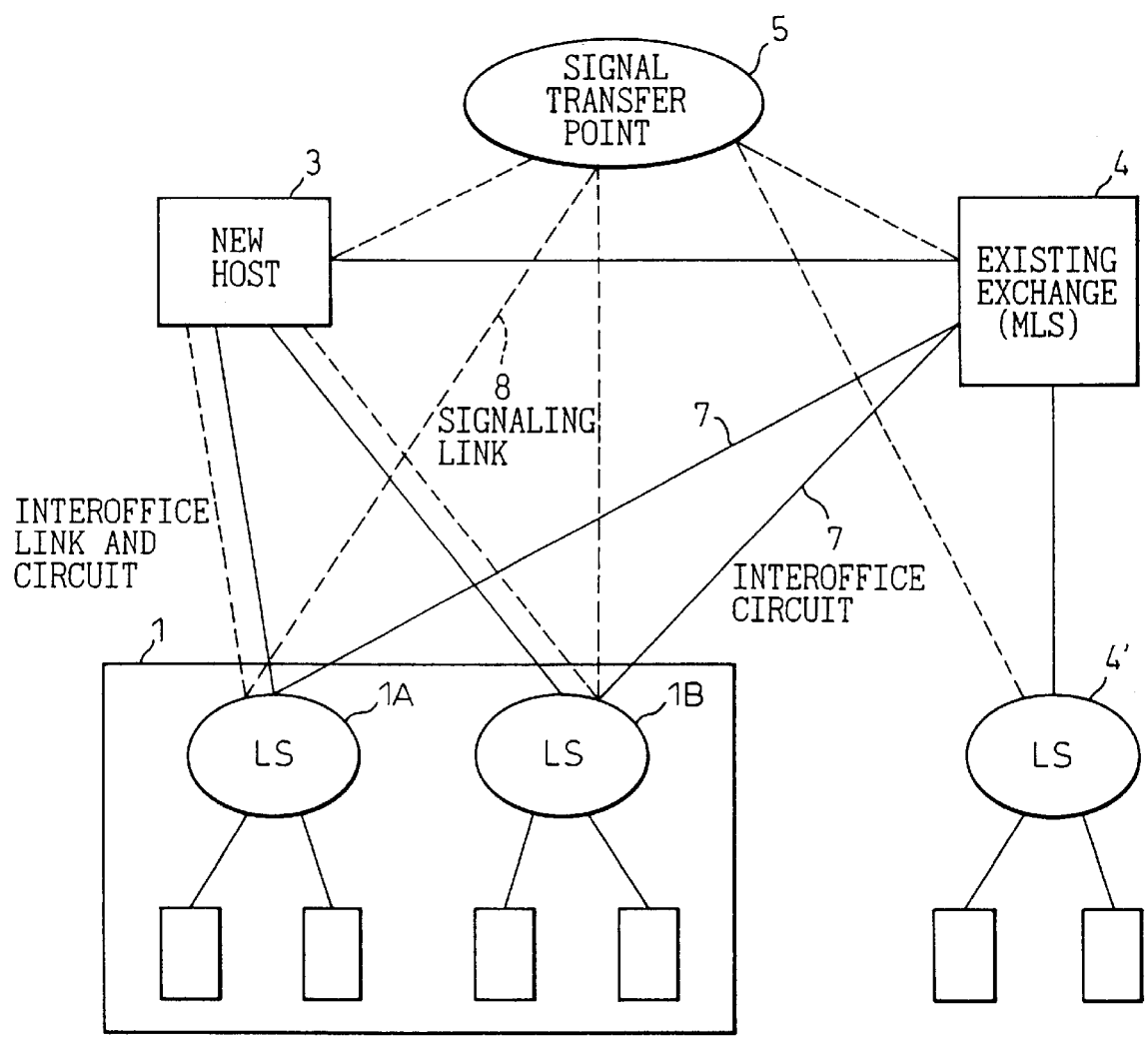
FIG. 29 is a diagram showing a migration flow (part 2) when implementing an interoffice configuration according to the present invention.

In contrast, in the present invention, an intraoffice connection such as shown in FIGS. 25 to 27 is avoided, and the accommodation is implemented using interoffice links and circuits. This not only eliminates the need for changes that were necessary for the intraoffice implementation, but can solve the whole problem of the above-described intraoffice configuration. FIGS. 28 and 29 are migration flows (part 1) and (part 2), respectively, illustrating the interoffice implementation according to the present invention. In. FIG. 28, reference numeral 1' is the portion supposed to be incorporated as the old host (by the EmRSU method), and reference numerals 3, 4, 4', 5, 7, and 8 are the same as those shown in FIG. 25.

As the first step, the new host 3 is incorporated into the existing network, as shown in FIG. 28. This is accomplished by connecting the new host 3 with the existing exchange office 5, while connecting between the new host 3 and the signal transfer point 5 by a signaling link. Next, the new host 3 is connected with each of the LS 1A and LS 1B in the old host by an interoffice link and circuit (interoffice circuit 7 and signaling link 8), as shown in FIG. 29. At this time, since the EmRSU processors 11 and 31 of the old host 1A, 1B and the new host 3 each cover MTP (Message Transfer Part), which is the platform of the Common Channel Signaling System, and all of its higher layers, as shown in FIG. 6, the need for improving the application software of the old host can be eliminated (only maintenance is needed).

Incorporating the old host into the new host by interoffice links and circuits as described above provides an excellent stand-alone capability. This will be explained with reference to FIG. 30.

Figure 30:
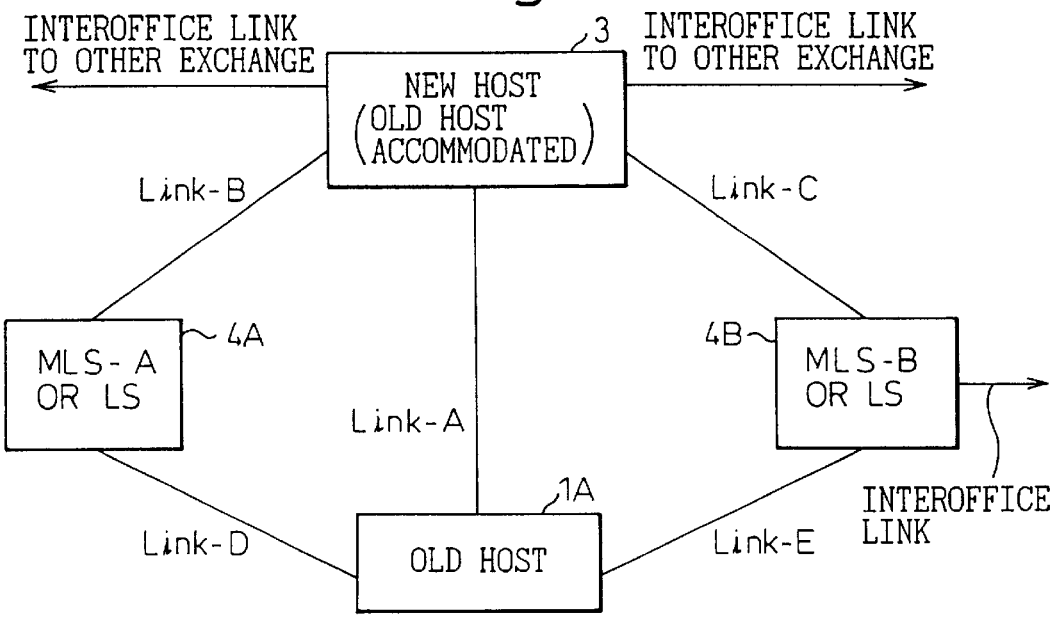
FIG. 30 is a diagram showing an example of a network configuration implemented by the EmRSU method.

FIG. 30 shows an example of a network configuration implemented by the EmRSU method. In the figure, 1A and 3 indicate the same elements as those designated by the same reference numerals in FIGS. 28 and 29; that is, 1A is the old host, 3 is the new host, while 4A and 4B are existing exchanges (LS/MLS). As shown, though the old host 1A is controlled from the new host 3, in the network the old host 1A has its own local exchange number and is, therefore, an independent exchange.

Thus the old host 1A is connected not only with the new host 3 but also with other existing exchanges 4A and 4B by interoffice links. In this configuration, while normally the old host 1A is connected with the new host 3 by Link-A, if this link is severed, the control from the new host 3 will not be severed, since the control can be routed via Link-B and Link-D or via Link-C and Link-E. Since the probability of all the links between the new host 3 and the old host 1A, including the alternate routes, being severed at the same time, is low, reliable control can be ensured for the old host 1A as long as the new host 3 remains operative.

Furthermore, since all the EmRSU messages are transmitted using Common Channel Signaling System No. 7, the messages are delivered to the old host 1A or the new host 3 using MTP, the platform of SS7, without being changed on the way at the existing exchange 4A or 4B, that is; in the same manner as when the messages are delivered via Link-A.

Figure 31:
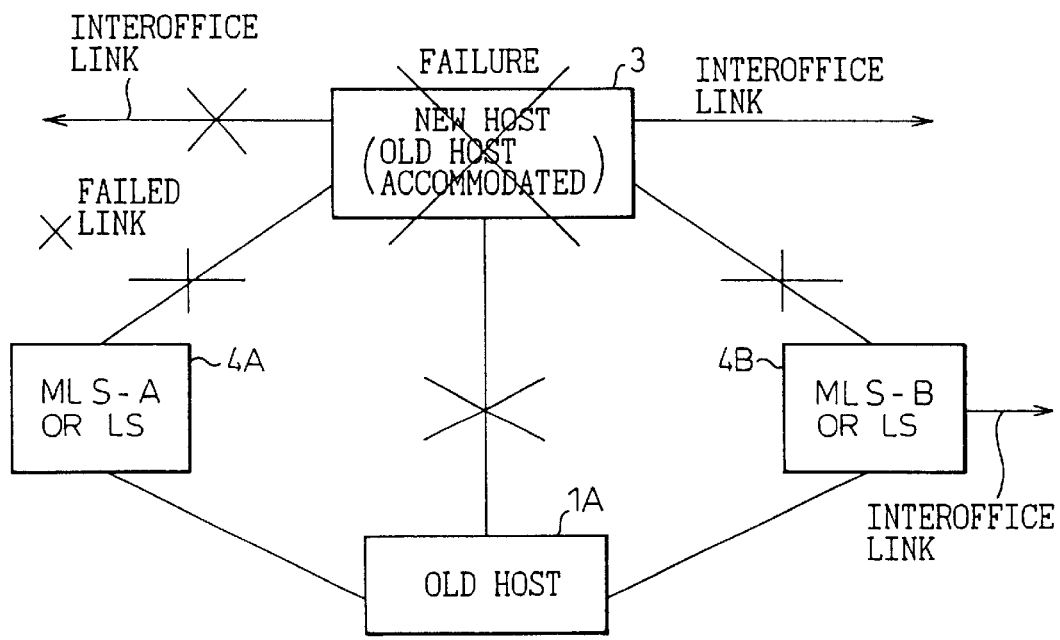
FIG. 31 is a diagram showing a network configuration in a stand-alone environment.

The only concern, therefore, is the failure of the new host 3. In case the new host 3 goes down, a standalone capability is designed into the old host 1A. The stand-alone capability provides the minimum required call processing, but since the old host 1A functions as an independent exchange, not only can calls to the fire station or police station, or even trunk calls of important subscribers, can be made, but usual incoming and outgoing calls are also possible. Another advantage is that, if the number of subscriber increases, the increase can be readily accommodated since not only the direct link but also many alternate links can be used because of the interoffice network configuration. FIG. 31 shows the network configuration in a stand-alone environment. The figure shows the situation when the new host 3 has failed and interoffice links to other exchanges, including Link-A, Link-B, and Link-C, are lost.

The following describes examples of message sequences according to EmRSU for an outgoing call, an incoming call, and an intraoffice call within the old host.

Figure 32:
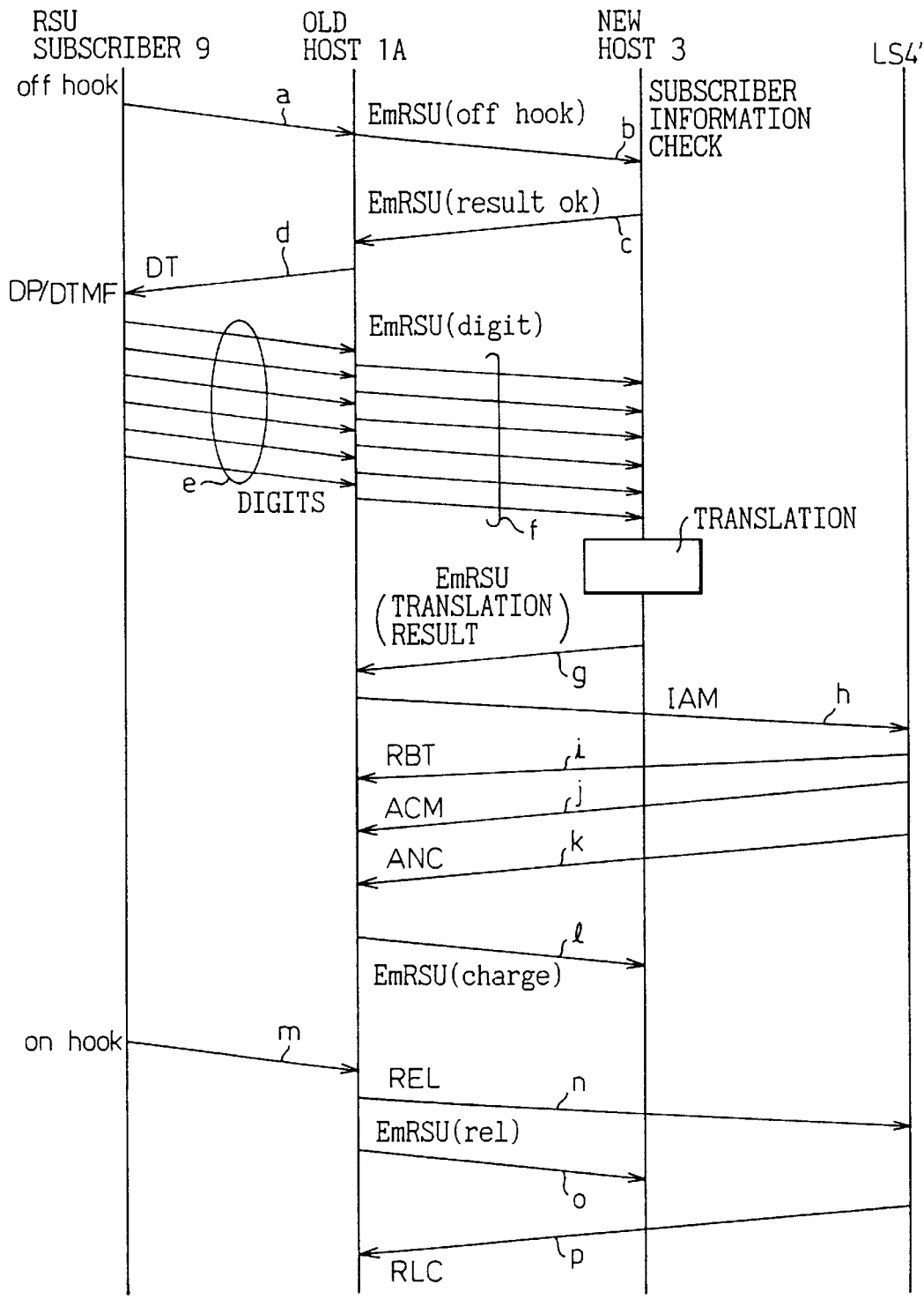
FIG. 32 is a diagram showing an example of a message sequence when processing an outgoing call according to EmRSU.

FIG. 32 shows an example of a message sequence when processing an outgoing call according to EmRSU, and more specifically an ISUP (ISDN User Part) message sequence when connecting an outgoing call from the subscriber 9, accommodated in the RSU (remote switching unit), to the existing exchange 41 (designated as LS) as the destination exchange, via the old host (designated as OLD HOST) 1A and the new host (designated as NEW HOST) 3 in the system configuration previously shown in FIG. 4. When the RSU subscriber 9 takes the telephone off-hook (a in FIG. 32), the old host 1A detects the off-hook condition and sends an off-hook EmRSU message to the new host 3 (b in the figure). The new host 3 checks the information concerning the calling subscriber and returns a result OK EmRSU message to the old host 1A (c in the figure), whereupon the old host 1A transmits a dial tone (DT) to the RSU subscriber 9 (d in the figure). When the RSU subscriber 9 transmits a multi-digit number (dial signal) by DP (dial pulses) or DTMF (Dual Tone Multi-Frequency: PB signal) (e in the figure), the old host 1A receives the number and sends an EmRSU message with each digit contained therein to the new host 3 (f in the figure). The new host 3 translates these digits (destination number), and sends the result of the translation, an EMRSU message carrying destination information, to the old host 1A (g in the figure). Upon receiving this message, the old host 1A sends an IAM message (Initial Address: Call setup message), containing the received message, to the destination exchange LS4' (h in the figure). The destination exchange then returns a ring back tone (RBT) to the old host 1A (i in the figure), which, if the connection to the destination is possible, is followed by an ACM message (j in the figure) and then by an ANC message signifying the starting of call, charging (k in the figure). Then, the old host 1A sends a charge start EmRSU message to the new host 3 (l in the figure). At the same time, communication between the RSU subscriber 9 and the called subscriber on the destination exchange LS4' is started. After that, when the RSU subscriber 9 ends the communication by going on-hook. (m in the figure), the old host 1A sends a call release message (REL) to the destination exchange LS4' (n in the figure) and, at the same time, sends a call release (rel) EmRSU message to the new host 3 (o in the figure). When a call release complete RLC message from the destination exchange LS4' arrives at the old host 1A (p in the figure), the message sequence ends.

Figure 33:
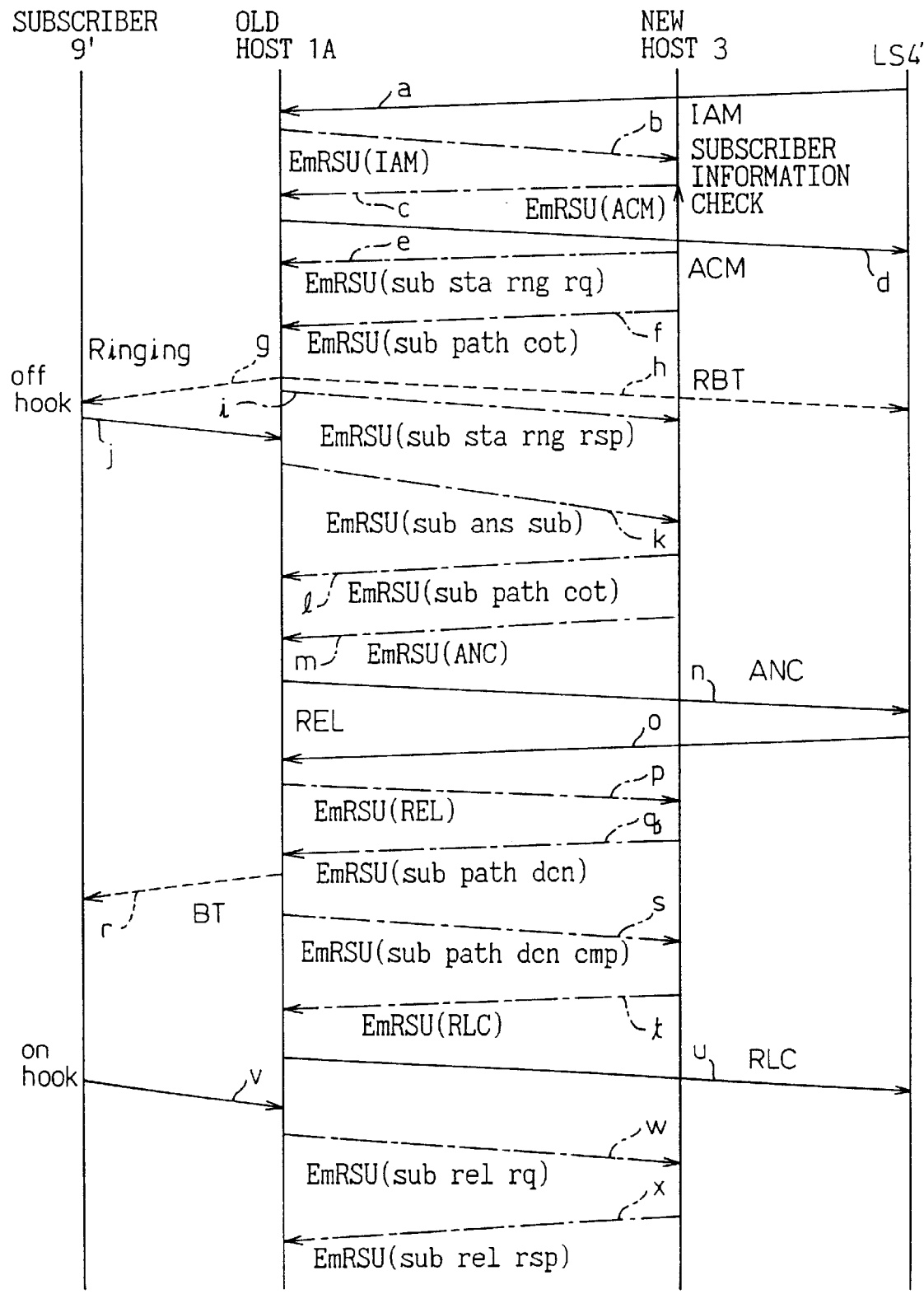
FIG. 33 is a diagram showing an example of a message sequence when processing an incoming call according to EmRSU.

FIG. 33 shows an example of a message sequence when processing an incoming call according to EmRSU; in this example, the system configuration comprises the subscriber 9' in the old host, the old host 1A, the new host 3, and the existing exchange 4' (LS), but the existing exchange (LS) 4' is now the originating exchange, and ISUP messages are transferred within the network.

When an IAM message from the originating exchange LS4' arrives at the old host 1A (a in FIG. 33), the old host 1A sends an EmRSU message according to the present invention, with the IAM contained therein, to the new. host 3 (b in the figure). In response, the new host checks the subscriber information by searching the subscriber information table using the destination address information contained in the IAM. The new host 3 sends an ACM (address information reception completion) EmRSU message with the result of the check contained therein to the old host 1A (c in the figure) which then transmits the ACM message contained therein to the originating exchange LS4, (d in the figure).

Following the transmission of the ACM EmRSU message to the old host 1A, the new host 3 sends a called subscriber ringing start request (Sub sta rng rq) in the form of an EmRSU message according to the present invention (e in the figure), and also sends an EmRSU message carrying a called subscriber path connection (Sub path cot) instruction (f in the figure). Thereupon, the old host 1A sends a ringing signal (Ringing) to the subscriber 9' (g in the figure), while transmitting a ring back tone (RBT) to the originating LS4' (h in the figure) and sending an EmRSU message carrying a subscriber ringing start-notification (Sub sta rng rsp) to the new host 3 (i in the figure).

When the subscriber answers (by going off-hook) (j in the figure), a subscriber answer (Sub ans sub) EmRSU message is sent to the new host 3 (k in the figure). Upon receiving this message, the new host 3 sends a path connection instruction EmRSU message (l in the figure, the same contents as f), and also sends a call charging start (ANC) instruction EmRSU message (m in the figure). Thereupon, the old host 1A sends an ANC message to the originating LS4' (n in the figure). Thereafter, communication is started, and when the communication ends, LS4' sends a call release instruction REL message to the old host 1A (o in the figure). Upon receiving, this message, the old host 1A sends an EmRSU message carrying a call release (REL) notification to the new host 3.(p in the figure). In response to this notification, the new host 3 sends a subscriber path disconnect (Sub path dcn) instruction to the old host 1A (q in the figure). In accordance with this instruction, the old host 1A sends out a busy tone (BT) to the subscriber 9' (r in the figure) and sends a subscriber path disconnect complete (Sub path dcn cmp) notification to the new host 3 (s in the figure) upon receiving this notification, the new host 3 sends an EmRSU message carrying a release complete (RLC) notification to the old host 1A (t in the figure). In response to this notification, the old host 1A sends an RLC message to the originating LS4' (u in the figure). When the subscriber 9' goes on-hook to end the communication (v in the figure), the old host 1A sends an EmRSU message carrying a subscriber release request (Sub rel rq) to the new host 3 (w in the figure) which responds by sending a release request received (Sub rel rsp) notification to the old host 1A (x in the figure).

Figure 34:
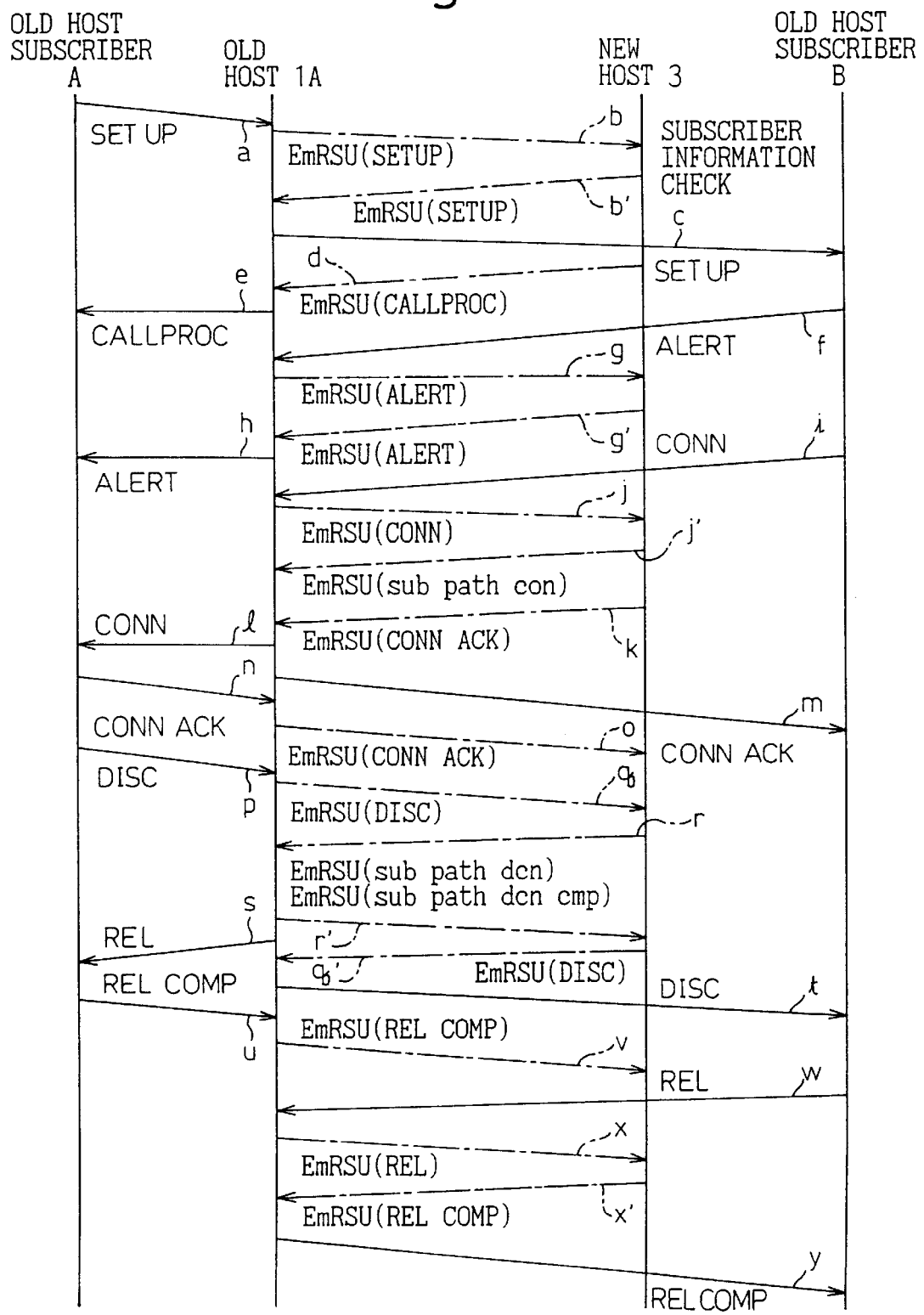
FIG. 34 is a diagram showing an example of a message sequence when processing an intraoffice call arising within the old host.

FIG. 34 shows an example of a message sequence for processing an intraoffice call arising within the old host; in this example, the system configuration comprises a subscriber A in the old host 1A, the old host 1A, the new host 3, and a subscriber B in the old host 1A, the subscriber A in the old host 1A being the call originator and the subscriber B the destination. Connection control within the old host 1A is also performed by transferring ISUP messages to and from the new host 3.

When the calling subscriber A sends SETUP (an ISDN call setup message according to the D channel protocol) to the old host 1A (a in FIG. 34), the old host 1A sends a SETUP EmRSU message containing the destination address to the new host 3 (b in the figure). The new host 3 checks the subscriber information and sends an EmRSU message containing the SETUP to the old host 1A (b' in the figure); then, the old host 1A sends the SETUP to the destination subscriber B (c in the figure). The new host 3 sends an EmRSU message carrying a CALLPROC (call setup in processing) notification to the old host 1A (d in the figure), and the old host 1A that received this message sends the CALLPROC message to the calling subscriber A (e in the figure).

When an ALERT message indicating that the called party is being alerted to an incoming call is sent from the destination subscriber B to the old host 1A (f in the figure), the old host 1A sends an EmRSU message (ALERT) to the new host 3 (g in the figure) which thereupon returns the EmRSU message containing the ALERT to the old host 1A (g' in the figure); then, the old host 1A transmits the ALERT message to the subscriber A (h in the figure). On the other hand, when the destination subscriber B responds by sending a CONN (connect) message to the old host 1A (i in the figure), the old host 1A sends an EmRSU message (CONN) to the new host 3 (j in the figure); then, the new host 3, sends an EmRSU message (Sub path con), carrying an instruction for a path connection with the subscriber A, to the old host 1A (j in the figure), and also sends a connection permit EmRSU message (Conn Ack) to the old host 1A (k in the figure).

Thereupon, the old host 1A sends the connection instruction CONN message to the calling subscriber A (l in the figure) and the connection permit CONNACK message to the destination subscriber B (m in the figure). The subscriber A sends a CONNACK message to the old host 1A (n in the figure) which then sends a CONNACK EmRSU message to the new host 3 (o in the figure). The communication can then be started.

After that, when the subscriber A ends the communication thereby transmitting a call release request (DISC) message to the old host 1A (p in the figure), the old host 1A sends an EmRSU message carrying the call release request (DISC) to the new host 3 (q in the figure). Upon receiving this request, the new host 3 sends an EmRSU message carrying a subscriber path release instruction to the old host 1A (r in the figure), and the old host 1A then sends a subscriber path release complete EmRSU message (sub path dcn cmp) to the new host 3 (r' in the figure). The new host 3, upon receiving this message, sends an EmRSU message carrying a call release request (DISC) to the old host 1A (q' in the figure). In the meantime, the old host 1A sends a disconnect notification (REL) to the subscriber A (s in the figure) and a call release (DISC) message to the destination subscriber B (t in the figure).

The subscriber A that received the notification (REL) sends a disconnect complete notification (RELCOMP) to the old host 1A (u in the figure) which then sends a RELCOMP EmRSU message to the new host 3 (v in the figure).

The destination subscriber B that received the DISC message send s a disconnect request (REL) message to the old host 1A (w in the figure) which then sends a REL EmRSU message to the new host 3 (x in the figure); upon receiving this message, the new host 3 sends a disconnect complete (RELCOMP) notification to the old host 1A (x' in the figure). The old host 1A that received this notification sends a disconnect complete message to the destination subscriber B (y in the figure), and the process is thus terminated.

According to the present invention, call processing control can be performed by the new host exchange, while making effective use of the resources of the old host exchange including the remote switch unit. Furthermore, when a host exchange accommodating a large number of subscribers becomes outdated, or when it is desired to provide to the subscribers new services that the existing exchange cannot provide, the new services can be provided using a newly installed exchange, without changing subscriber hardware accommodated in the existing exchange. This serves to reduce the cost involved.

What is claimed is:

1. An exchange control method, comprising the steps of:
   accommodating an old host exchange as a remote switch unit in a new host exchange,
   connecting between said new host exchange and said old host exchange in an interoffice configuration by data and signaling links; and
   controlling an operation of said old host exchange as a remote switch by said new host switch via said signaling link, in a manner of emulating exchange processes between a host exchange and a remote switch through an emulation processor of said new host exchange and an emulation processor of said old host exchange, each of said emulation processors having a translation table to carry out its emulation functions.

2. An exchange control method as claimed in claim 1, wherein
   said translation table provided with said emulation processor of said old host exchange is at least used for translating subscriber identification information and subscriber line trunk information of said accommodated subscribers to and from subscriber identification information and subscriber line trunk information used to manage each of said subscribers at said new host exchange, and
   said new host exchange manages each of said subscribers by using a number translated for said new host exchange from said subscriber information held in said old host exchange.

3. An exchange control method as claimed in claim 1, wherein said emulation processor in said old host exchange includes a signal receiving section for receiving signals from said accommodated subscribers or from subscribers accommodated in said remote switch unit attached to said old host exchange, a calling subscriber identification number translation section having a table for translating calling subscriber information between said old host exchange and said new host exchange, and a message processing section for performing transmission and reception of unique messages to and from said new host exchange, and wherein
   when an off-hook signal, destination number, or other information from a calling subscriber is received by said receiving section, said calling subscriber identification number translation section translates the identification number of said calling subscriber into the number managed at said new host exchange, and
   said message processing section, using said translated calling subscriber identification number, creates a message containing the received information and transmits said message to said new host exchange.

4. An exchange control method as claimed in claim 3, wherein when a message reporting called party ringing, call charging start, called party call release complete, or other status, is received from other exchange via a common channel signaling system signaling link, said emulation processor in said old host exchange creates a message containing information signifying said reported status and transmits said message to said new host exchange.

5. An exchange control method as claimed in claim 1, wherein said emulation processor in said new host exchange includes a signal receiving section for performing transmission and reception of emulation signals, a calling subscriber terminal information management section for managing subscriber information concerning the subscribers accommodated in said old host exchange, and an emulation call processing section for performing message processing and management of old host interoffice trunks, and wherein
   when said signal receiving section receives a destination number from said old host exchange, said emulation call processing section translates said destination number to extract destination-side information, retrieves an open trunk from said managed old host interoffice trunks, edits a call setup message containing information of said retrieved trunk, and transmits said message to said old host exchange.

6. An exchange control method as claimed in claim 5, wherein when said call setup message is received from said new host exchange, said emulation processor in said old host exchange transmits a call setup message to other exchange vie the specified trunk and, when a notification signifying that the destination is ready to answer is received from said other exchange, then transmits a call charging start message to said new host exchange.

7. An exchange control method as claimed in claim 1, wherein when a call setup message is received from other exchange, said emulation processor in said old host exchange transmits a message containing call setup information to said new host exchange, and
   when said message is received, said emulation processor in said new host exchange checks called subscriber information, and transmits to said old host exchange a message containing information signifying the result of said check and ringing start and a message containing a ringing and path connection instruction.

* * * * *